(12) United States Patent
Flitsch et al.

(10) Patent No.: US 11,194,306 B2
(45) Date of Patent: Dec. 7, 2021

(54) METHODS AND APPARATUS FOR MOBILE ADDITIVE MANUFACTURING WITH ADDITIVE MANUFACTURING ARRAYS

(71) Applicant: ADDIBOTS, LLC, New Windsor, NY (US)

(72) Inventors: Robert A. Flitsch, New Windsor, NY (US); Frederick A. Flitsch, New Windsor, NY (US)

( * ) Notice: Subject to any disclaimer, the term of this patent is extended or adjusted under 35 U.S.C. 154(b) by 751 days.

(21) Appl. No.: 15/029,475

(22) PCT Filed: Apr. 13, 2016

(86) PCT No.: PCT/US2016/027309
§ 371 (c)(1),
(2) Date: May 8, 2017

(87) PCT Pub. No.: WO2016/168314
PCT Pub. Date: Oct. 20, 2016

(65) Prior Publication Data
US 2017/0232666 A1    Aug. 17, 2017

Related U.S. Application Data

(63) Continuation-in-part of application No. 14/310,556, filed on Jun. 20, 2014, now Pat. No. 9,724,877, which
(Continued)

(51) Int. Cl.
*G05B 19/31*    (2006.01)
*B33Y 10/00*    (2015.01)
(Continued)

(52) U.S. Cl.
CPC .............. *G05B 19/31* (2013.01); *B22F 12/00* (2021.01); *B29C 63/06* (2013.01); *B29C 64/106* (2017.08);
(Continued)

(58) Field of Classification Search
CPC .................................................. B29C 64/209
See application file for complete search history.

(56) References Cited

U.S. PATENT DOCUMENTS 2,126,869 A  *  8/1938  Burchenal ............... B29C 70/64
264/211.11
3,844,483 A  *  10/1974  Gray ..................... B05B 9/0409
239/322
(Continued)

FOREIGN PATENT DOCUMENTS

CN    202202237 U    4/2012
CN    102953312 A    3/2013
(Continued)

OTHER PUBLICATIONS

"Discover Kiosk : a Mobile 3D Printing Truck." Sculpteo, Nov. 8, 2012, www.sculpteo.com/blog/2012/11/08/kiosk-mobile-3d-printing-truck/. (Year: 2012).*

*Primary Examiner* — Nahida Sultana

(57) ABSTRACT

The present disclosure provides various aspects for mobile and automated processing utilizing additive manufacturing and the methods for their utilization and for making material dispensing element arrays for use of the additive manufacturing device.

10 Claims, 12 Drawing Sheets

Related U.S. Application Data is a continuation-in-part of application No. 14/310,443, filed on Jun. 20, 2014, now abandoned.

(60) Provisional application No. 62/286,836, filed on Jan. 25, 2016, provisional application No. 62/148,035, filed on Apr. 15, 2015, provisional application No. 61/838,302, filed on Jun. 23, 2013.

(51) Int. Cl.

| | | |
|---|---|---|
| *B33Y 30/00* | (2015.01) | |
| *B33Y 40/00* | (2020.01) | |
| *B33Y 50/02* | (2015.01) | |
| *B29C 63/06* | (2006.01) | |
| *B29C 65/48* | (2006.01) | |
| *B29C 65/00* | (2006.01) | |
| *B29C 64/386* | (2017.01) | |
| *E01C 23/06* | (2006.01) | |
| *B29C 64/106* | (2017.01) | |
| *B29C 64/118* | (2017.01) | |
| *B29C 64/20* | (2017.01) | |
| *B29C 64/112* | (2017.01) | |
| *B22F 12/00* | (2021.01) | |
| *B29K 21/00* | (2006.01) | |
| *B29K 105/00* | (2006.01) | |
| *B29K 621/00* | (2006.01) | |
| *B29L 31/00* | (2006.01) | |
| *B29C 64/393* | (2017.01) | |
| *E01C 23/01* | (2006.01) | |
| *E01C 23/09* | (2006.01) | |
| *B22F 10/10* | (2021.01) | |

(52) U.S. Cl.
CPC .......... *B29C 64/112* (2017.08); *B29C 64/118* (2017.08); *B29C 64/20* (2017.08); *B29C 64/386* (2017.08); *B29C 65/48* (2013.01); *B29C 66/52272* (2013.01); *B33Y 10/00* (2014.12); *B33Y 30/00* (2014.12); *B33Y 40/00* (2014.12); *B33Y 50/02* (2014.12); *E01C 23/065* (2013.01); *B22F 10/10* (2021.01); *B22F 2999/00* (2013.01); *B29C 64/393* (2017.08); *B29K 2021/00* (2013.01); *B29K 2105/256* (2013.01); *B29K 2621/00* (2013.01); *B29L 2031/757* (2013.01); *B29L 2031/776* (2013.01); *E01C 23/01* (2013.01); *E01C 23/096* (2013.01); *E01C 23/0966* (2013.01); *G05B 2219/49023* (2013.01); *Y02P 10/25* (2015.11)

(56) References Cited

U.S. PATENT DOCUMENTS

| | | | | |
|---|---|---|---|---|
| 4,842,441 | A  * | 6/1989 | Watkins | E01C 19/15 404/107 |
| 5,294,210 | A  * | 3/1994 | Lemelson | B05B 12/122 404/108 |
| 5,614,670 | A  * | 3/1997 | Nazarian | E01C 23/00 73/146 |
| 6,206,607 | B1 * | 3/2001 | Medico, Jr. | E01C 5/18 404/2 |
| 6,299,934 | B1 * | 10/2001 | Manning | B05B 12/12 342/357.34 |
| 9,231,498 | B2 * | 1/2016 | Hashimoto | F03G 7/005 |
| 2005/0065400 | A1 * | 3/2005 | Banik | A61B 1/00059 600/109 |
| 2006/0240183 | A1 * | 10/2006 | Pollard | E01C 7/356 427/138 |
| 2006/0258912 | A1 * | 11/2006 | Belson | A61B 1/005 600/152 |
| 2007/0164641 | A1 * | 7/2007 | Pelrine | A61M 5/142 310/11 |
| 2008/0253834 | A1 * | 10/2008 | Colvard | E01C 19/006 404/84.05 |
| 2010/0041795 | A1 * | 2/2010 | Wilson, Jr. | C04B 28/04 524/2 |
| 2012/0031724 | A1 * | 2/2012 | Noll | E01C 19/48 192/31 |
| 2013/0051913 | A1 * | 2/2013 | Eul | E01C 23/07 404/84.5 |
| 2014/0106066 | A1 * | 4/2014 | McGuffie | E01C 23/20 427/137 |
| 2014/0188002 | A1 * | 7/2014 | Close | A61B 5/155 600/581 |
| 2014/0203479 | A1 * | 7/2014 | Teken | B33Y 30/00 425/86 |
| 2014/0374933 | A1 * | 12/2014 | Flitsch | B29C 64/386 264/40.1 |
| 2015/0079214 | A1 * | 3/2015 | Shi | B29C 67/0059 425/130 |
| 2015/0171305 | A1 * | 6/2015 | Hashimoto | H01L 41/0471 310/365 |
| 2016/0229124 | A1 * | 8/2016 | Yoshikawa | B29C 64/393 |
| 2016/0236411 | A1 * | 8/2016 | Ohnishi | B41J 3/44 |
| 2016/0325498 | A1 * | 11/2016 | Gelbart | B33Y 30/00 |

FOREIGN PATENT DOCUMENTS

| | | |
|---|---|---|
| EP | 2772626 A1 | 9/2014 |
| WO | 2012087150 A1 | 6/2012 |

* cited by examiner

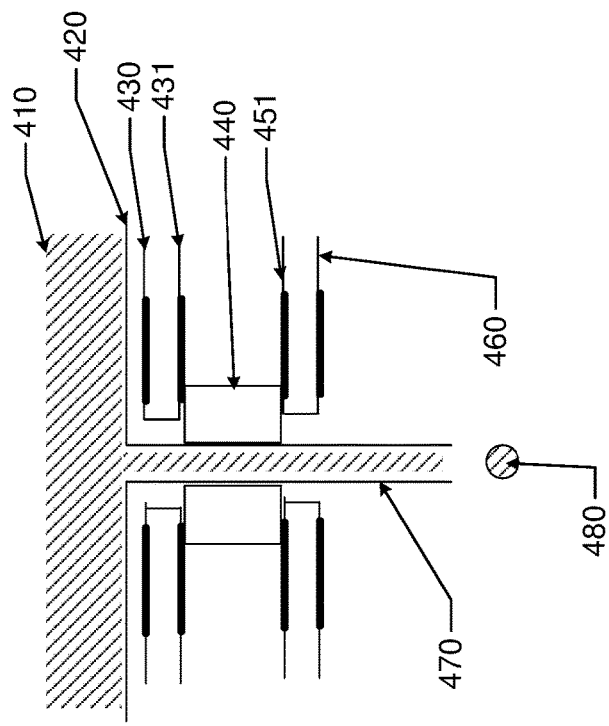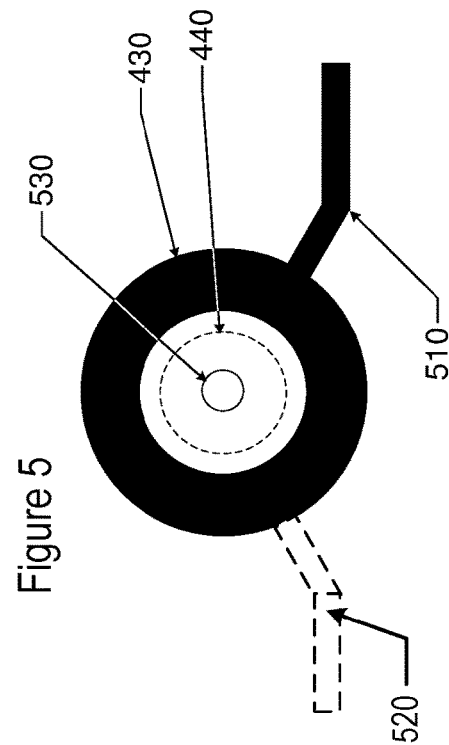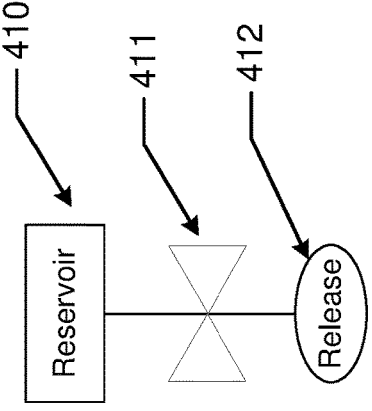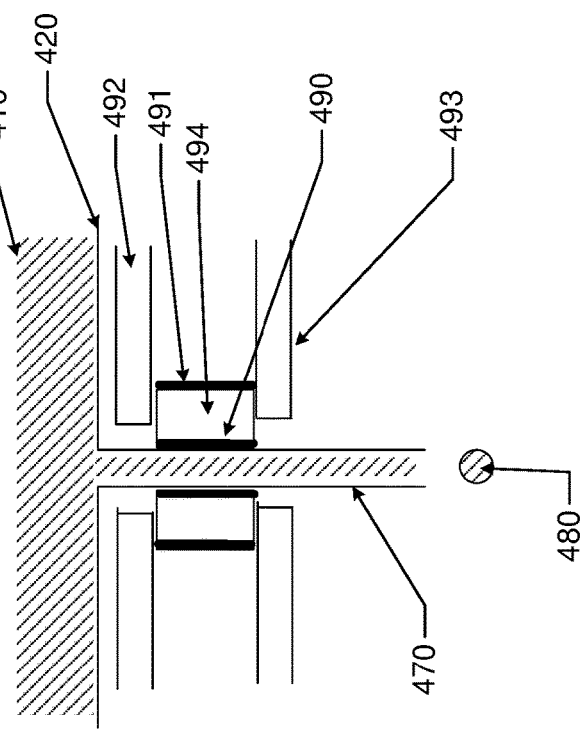

METHODS AND APPARATUS FOR MOBILE ADDITIVE MANUFACTURING WITH ADDITIVE MANUFACTURING ARRAYS

CROSS REFERENCE TO RELATED APPLICATION

This application claims the benefit of the U.S. Provisional Application Ser. No. 62/148,035 filed on Apr. 15, 2015. This application claims the benefit of the U.S. Provisional Application Ser. No. 62/286,836 filed on Jan. 25, 2016. This application claims priority to the U.S. Non-Provisional patent application Ser. No. 14/310,556, filed on Jun. 20, 2014 and entitled METHODS AND APPARATUS FOR MOBILE ADDITIVE MANUFACTURING OF ADVANCED STRUCTURES AND ROADWAYS as a Continuation in Part patent application. This application also claims priority to the U.S. Non-Provisional patent application Ser. No. 14/310,443, filed on Jun. 20, 2014 and entitled METHODS AND APPARATUS FOR MOBILE ADDITIVE MANUFACTURING as a Continuation in Part patent application. The application Ser. No. 14/310,443 claims the benefit of the U.S. Provisional Application Ser. No. 61/838,302 filed on Jun. 23, 2013. The contents of each are relied upon and hereby incorporated by reference.

FIELD OF THE INVENTION

The present disclosure relates to methods and apparatus that support mobile additive material processing. Robotic and human controlled mobility may be combined with additive manufacturing techniques that "print" or additively deliver materials to specific locations over distances. Arrays of material dispensing elements as parts of additive manufacturing devices and their production are disclosed. The methods and apparatus may be applied to the productions of advanced building structures and roadways.

BACKGROUND OF THE INVENTION

A known class of approaches to material fabrication can be classified as additive manufacturing. Material in various forms, including solid, powder, gel, gas or liquid forms may be processed in such a manner to deposit or lock in material in a target location in space.

Numerous techniques may be utilized to perform additive manufacturing. In extrusion processes materials in wire or filament form are controlled by an extrusion head which may be moved above a work area. In some examples, the filament may be heated by an element in other examples an energy source such as a laser may be employed. The use of multiple extrusion heads and extrusion material may allow for both permanent and temporary structures to be formed. By building the extruded material in layers or in regions complex shapes may be formed in three dimensions. However, the technology is limited by the dimensions of the work space—the ability of the head or heads to move in the two dimensions of a plane and also by the dimension of the ability of the head to move vertically relative to a planar support structure. There may be numerous variations on this form of additive manufacturing.

A different class of additive manufacturing may be classified as Stereolithography. In this class, a light or heat source is used to transform the material in space. In some Stereolithography implementations, the work support plane is submerged in a photoactive or thermo-active liquid and a laser or other light or heat source is rastered across a thin surface layer of the liquid between the support structure and the top level of the liquid. By translating the support structure down a layer, into the liquid the fluent nature of the liquid reforms a thin layer of new unreacted material over the work surface or the previously processed layer.

Versions of Stereolithography may also work with powder formed starting material. The powder may be shaped into a thin layer and then a spatially defined. Lasers may be used to transform portions of the layer into a solidified material. In other examples, other energy sources such as, for example, electron beams, may be used to transform the powder. Various materials including metals, insulators and plastics may be formed into three dimensional shapes by these processing techniques.

A different type of processing occurs when a print head is used to deposit material onto the powder. The deposit may chemically react with the powder or may be an adhesive that consolidates the powder into an adhered location. The prevalence of high resolution printing technology may make this type of additive manufacturing process cost effective.

The field is both established, with versions of additive manufacturing being practiced for decades; and emerging, with new techniques and materials being defined with rapidity. The technology may be currently limited by the dimensions of objects that may be produced and limits on size that are placed by the size of the additive manufacturing equipment.

Accordingly, it may be desirable to develop methods and apparatus that may allow additive manufacturing techniques and apparatus to be independently mobile. The throughput of such devices may be improved by the production of arrays of material dispensing elements that may be controlled in relatively large combinations to add material to surfaces in rapid manners. Therefore it may be desirable to create high throughput controllable arrays of material dispensing elements to support the techniques of mobile additive manufacturing robotics.

SUMMARY OF THE INVENTION

Accordingly, the present disclosure provides description for methods and apparatus that allow for mobile additive manufacturing and the application of these techniques to the production of advanced building structures and advanced roadways. In some examples, the mobile additive manufacturing apparatus make act in an independent or automated manner. The apparatus that performs the mobile additive manufacturing may be called an Addibot (ADDItive roBOT).

An important characteristic of additive manufacturing apparatus may be that material is added to a product in a controlled manner that is driven by a digital model that resides in a controller. Through the processing of the additive manufacturing apparatus the digital representation may be translated to a physical approximation of material placed in three dimensional space.

Accordingly in some examples of this disclosure, a mobile additive manufacturing apparatus which may be called an Addibot may be configured to comprise a drive system which may be operative to move the apparatus along a surface. In some examples the Addibot may function with no physical tether. In addition, the Addibot may comprise a navigation system which among other functions may determine the Addibot's current location and its current bearing or direction that it would travel in when caused to move or is travelling in if moving.

The Addibot may additionally comprise a controller capable of executing code which may perform an algorithmic function. The controller may also provide controlling signals to other elements of the Addibot. The Addibot may additionally comprise an additive manufacturing system to deposit a material or combination of materials in prescribed locations across the surface that the Addibot is on or will move to during its processing. The additive manufacturing system may add material to a surface based on a digital model that may be processed in one or more controllers that may be located in the Addibot. The origin of the digital model may be determined externally to the Addibot or alternatively may be determined by sensing or other processing of the Addibot, or may be a combination of external model definition combined with the data related to sensing apparatus within the Addibot. The systems that the Addibot has may be powered by a power system capable of providing power to operate at least the drive system, the navigation system, the control system and the additive manufacturing system of the Addibot. In some examples multiple power systems may be present in an Addibot.

The additive manufacturing system of an Addibot may include many different types and definitions capable of adding material based on a digital model in controlled fashion. In some examples, the additive manufacturing system may comprise a three dimensional ("3D") printing head. The printing head may add material to a surface in many standard manners including extrusion of a material by the printing head or ejection of material in liquid or solvated form.

In some examples, the 3d printing head may comprise an array of nozzles which individually eject liquid form droplets in response to an electronic control signal provided to the nozzle. In some examples, the liquid that may be process by the 3d printing head may comprise one or more of water, a water or aqueous solution, a hydrocarbon based solvent, an inorganic solvent or an emulsion of a combination of two or more of water, hydrocarbon or inorganic based solvents. Solutions may comprise a material solvated in one or more of the water, hydrocarbon or inorganic based solvents.

In another aspect, a dimension of time may be included wherein one or both of: a) a specified rate of extrusion and b) a specified order of extrusion is controlled in order to obtain a desired result. Embodiments may accordingly include a ratio of time over distance and rate of extrusion.

In some additional examples, an Addibot may engage in Continuous Liquid Interface Production+wherein a specified wavelength of energy, such as ultraviolet light and a chemical component, such as oxygen are projected through a volume of liquid. In such embodiments an Addibot may move in two or three dimensions through, or in proximity to a volume of liquid, and provide increased speed and capabilities as compared to extrusion type additive manufacture systems.

In some examples, the Addibot may also comprise a vision system. The vision system may be operant to create a digital model of the topography of a surface in a region proximate to the mobile additive manufacturing apparatus. The vision system may operate on or within the Addibot and use a variety of detection schemes for analyzing the surface and creating the model of the surface including light or laser based imaging techniques or other electromagnetic radiation based imaging including infrared, ultraviolet or other electromagnetic radiation sources. In some examples, the vision system may utilize sound based radiations to create a digital model of its surroundings which may include the surface in the region of the Addibot. In other examples, the Addibot may deploy a physical sensor to determine the topography of the surface in a region studied by the vision system. A controller located within the Addibot may initiate the operation of the vision system and may receive signals in response to the metrology that the vision system performs. In other examples, the Addibot may communicate with a vision system that is located external to itself or on another Addibot for example.

In some examples, the Addibot may also comprise a material storage system capable of storing at least a first material to be supplied to the additive manufacturing system. The stored material may include solids, powders, gels, liquids or gasses to mentions some non-limiting examples. In some examples, the material may be in wire forms or in some example may exist as physical solid entities which are placed by the additive manufacturing system. The material storage system may maintain a storage condition for the material by controlling an environmental condition. The condition that may be controlled may include one or more of temperature or pressure of the material.

In some examples, the Addibot may also comprise a surface preparation system. The surface preparation system may be capable of removing one or more of flaked surface material, dust, dirt and debris from the surface region in a region in advance of the additive manufacturing apparatus. Since the Addibot may move or when stationary the additive manufacturing system within the Addibot may move in a direction, the surface preparation system may be operant to process a region of the surface where the additive manufacturing system on its own or under the drive system of the Addibot may move to.

In some examples, the Addibot may also comprise a communication system that may be capable of transmitting signals outside the mobile additive manufacturing apparatus. In some examples users may use communications systems external to the Addibot in transmitting a control signal or control signals to the Addibot. The communication system may also be capable of receiving signals originating outside of the mobile additive manufacturing apparatus. In some examples, the signals transmitted or received may comprise one or more of radiofrequency signals, infrared signals, optical signals or sound based signals or emissions as non-limiting examples. In some examples the communication system may function to sense the environment of the mobile additive manufacturing apparatus. The sensing may occur in addition to signal transmission function. In some examples, there may be multiple communication and/or sensing systems within an Addibot.

In some examples, the power system of an Addibot may comprise a battery.

In some examples, the power system of an Addibot may comprise a combustion engine or other type of engine.

In some examples the power system of an Addibot may comprise an electrical wire that may be connected to an electrical power source that may reside external to the Addibot which may also be called a mobile additive manufacturing apparatus.

There may be numerous methods related to a mobile additive manufacturing apparatus. In some examples a user may transmit a signal to an Addibot which may include any of the types of examples of apparatus that have been described. The transmitted signal may cause the Addibot to next deposit a first layer of material on a surface utilizing systems of the Addibot. The Addibot may, in continued response to the initial signal, move from a first location to a second or different location. After moving, the Addibot may in further continued response to the initial signal deposit a second layer of material. The makeup of the first layer and second layer of material may be different in composition or physical aspects such as thickness or may be identical except in the aspect that it is located in a second location.

In some examples, the methods may additionally include a step to orient the apparatus for mobile additive manufacturing, which may be called an Addibot, in a spatial coordinate system.

In some examples, the methods may additionally include a step to perform a metrology process to measure the topography of a region of a surface. This may typically be in a region proximate to the Addibot or in a region that the Addibot will move to. In some examples additional steps in the method may include processing the result of the metrology process and using the result of the processing to control the additive manufacturing system of the Addibot.

The Addibot with an additive manufacturing array may interact with infrastructure for advanced roadways through which electrical signals may be communicated. Some examples may include power and charging electrical devices, transmitters of various kinds in roadway, and transmitters of various kinds alongside of roadway. Some transmitters may communicate via wired means and others may communicate at least in part by wireless means. Within a constructed roadway as described in this disclosure there may be devices to control or generate signaling information for location, signaling information relating to the status of the roadway or sensors within the roadway. In some examples, roadway systems may be configured to transmit data along the path of the roadway. In some examples the transmission along the roadway may comprise completely wireless communication in other examples a combination of wireless and wired, sometimes with portions of the path beneath the roadbed may occur. There may also be communication from systems to equipment in the vicinity of the roadway and to neighboring commercial and residential structures. One general aspect includes a mobile additive manufacturing apparatus including: a controller capable of executing algorithms and providing control signals; an additive manufacturing system to deposit at least a first material in prescribed locations across a surface according to a first digital model processed by the controller, where the system is included of an array of material dispensing elements; a drive system operative to transport the additive manufacturing system along the surface; a navigation system to determine a location of the additive manufacturing system and guide the drive system; and a power system capable of providing power to operate at least the drive system, navigation system, control system and additive manufacturing system.

Implementations may include one or more of the following features. The apparatus may include dispensing elements which include an electroactive elastomeric actuator.

The apparatus may include dispensing elements which include an electroactive non-elastomeric actuator. The apparatus may include dispensing elements where the electroactive non-elastomeric actuator includes a piezoelectric. The apparatus may include dispensing elements where the electroactive non-elastomeric actuator includes an inductively controlled throttle.

The apparatus may include dispensing elements where the dispensing elements include a first electroactive actuator which may be elastomeric, where the first electroactive actuator controls flow from a material reservoir to a cavity within the dispensing element; and the dispensing elements include a second electroactive actuator where the second electroactive actuator supports control of material flow from the cavity to an external work surface.

The apparatus may also include dispensing elements where the dispensing element additionally includes: a plurality of electroactive actuators. The plurality of electroactive actuators may be arranged in a pattern that spans at least a two dimensional layout. In some examples, the plurality may be arranged in an array that has elements oriented in both location across a plane and in height off of the plane.

In some examples, the electroactive elastomeric actuator may comprise elastomer layers that are configured to exert an aggregate force along the plane of the elastomer layer with electrodes compressing the elastomer to result in expansion perpendicular to the electrodes.

In other examples, elastomers may be configured with structured electrodes or structured elastomers comprising bumps or holes in the elastomer, such that the structured materials create voids or gaps where material may fill under elastomeric stress. In some of these other examples, the resulting aggregate force may be perpendicular to the plane of the elastomer layer, or in another sense may result in an aggregate motion along the direction of the electric field.

In other examples, rolled versions of elastomer may create additive manufacturing elements which clamp or clasp an inner cylindrical region. For elastomeric films which have structured electrodes or elastomer films, the motion direction which on aggregate may be in the direction of the electric field, may be focused by the cylindrical orientation of the film to result in motion towards and away from a central cylinder internal to the wrapped films.

BRIEF DESCRIPTION OF THE DRAWINGS

The accompanying drawings, that are incorporated in and constitute a part of this specification, illustrate several examples of the invention and, together with the description, serve to explain the principles of the invention:

FIG. 4 illustrates a generic material dispensing element.

FIG. 4A illustrates an example of one material emission device from the exemplary deposition regions where sheets of material have electrodes on their surfaces.

FIG. 4B illustrates another example of one material emission device from the exemplary deposition regions where annular regions that material is emitted through has the electrode regions.

FIG. 5 illustrates a top view of one of the exemplary material emission devices.

DETAILED DESCRIPTION OF PREFERRED EXAMPLES

The present disclosure relates to methods and apparatus for mobile automated additive manufacturing. As used herein, "mobile automated additive manufacturing" may include control of locomotion of an additive manufacturing apparatus over a surface free of tracks or rails.

Glossary

Addibot—as used herein in the entirety of the specification, Addibot shall refer to an additive manufacturing robot. In some examples, an additive manufacturing robot may refer to an apparatus for mobile automated additive manufacturing.

Topography and Topology—as used herein in the entirety of the specification Topography and Topology will have synonymous meaning which shall refer to the configuration of a surface including its relief and the position of its natural and man-made features.

DESCRIPTION

Figure 1:
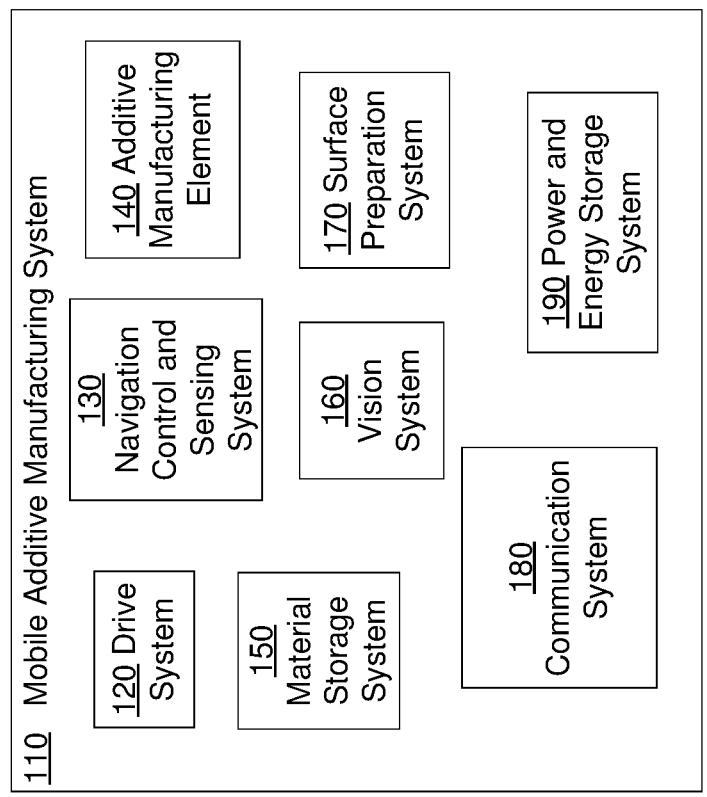
FIG. 1 illustrates a block diagram of the general components of a mobile automated additive manufacturing apparatus.

Referring to FIG. 1, 100, some elements of an exemplary mobile additive manufacturing system (110) may be found. The system may have a movement system 120 enabling transportation of the manufacturing system over a surface. This movement system may also be referred to as a drive system. The movement system 120 may function to move the apparatus on both flat and shaped or curved topography. The movement system 120 may function on wheels, balls, tracks or other means of conveyance known in the art. In some examples, the use of automotive or truck frames either with trailers or with modification directly to the frame itself may be used. The movement system 120 may incorporate a drive mechanism comprising an engine or motor that may act upon the conveyance elements such as wheels or may utilize transmissions and axles to drive the conveyance elements. Various forms of directional or steering control may be possible. In some examples, the differential control of multiple motors acting upon conveyance elements may allow for directional control. In other examples, the directional control may function by a steering system that moves the conveyance elements in ways other than in its drive sense.

The mobile additive manufacturing system 110 may include a Navigation, Control and Sensing system 130 that may function to determine a current location to a desired degree of accuracy as well as an orientation of the device at that location. Such information may be useful in regulating direction control through the navigation system and in determining other control variables such as speed. The sensing system may provide other environmental information to the control system such as temperature and humidity at the location and in some examples at a surface beneath the location of the system. In addition, the sensor and navigation elements may also function to provide awareness of obstacles in the environment of the mobile additive manufacturing apparatus.

A separate vision, measurement and inspection system may be present in some examples (a following discussion discusses this in detail) and may interface with the control elements or sensing elements. The control elements may receive data in various forms and may process the data utilizing computational hardware and programming algorithms. The processing may produce control signals to engage the mobile additive manufacturing apparatus to produce an environmental change such as adding material of various forms to create three dimensional surface characteristics such as a flat surface, a surface of defined topography or a surface where defects of various types are affected with the addition of material. In other examples, the addition of material may be used to create an image or another functional aspect such as a slip resistive coating or a tread cleaning function as examples.

The navigation element may utilize various protocols to generate location awareness. For example, the element may utilize GPS technology. In other examples, a local transceiver network may provide telemetry local relative location awareness through the use of RF systems, or light based systems such as a laser based system This local system may function within an outdoor region or alternatively be set up to function within a building. Cell phone based telemetry, and other schemes such as seismic location detection may provide information for telemetry. In some examples, the navigation element may provide a first order telemetry to an accuracy required to control movement of the apparatus, for example. One or more sensing elements, such as a vision system (to be discussed below) may provide a next higher accuracy for calibration of location.

Location marks may be present upon or within the surface and a sensor such as a camera system, for example, may pick up the location marks to calibrate the navigation system and the control system. Various other reference elements such as physically defined lines, such as found on roads or parking lots may be a type of navigation control system. Still further examples may involve the embedding of conductive wires to create a navigation information system. A grid of such conductive wires may create a calibrated work floor with a good deal of accuracy. In still further examples, the surface to be acted on by the mobile additive manufacturing apparatus may be a temporary surface that may itself be moved. Sheets of a temporary material may function as the surface and these sheets as well may include coloration and/or physical elements such as embedded conductors to provide a telemetry signal for the navigation element.

The Navigation, Control and Sensing system 130 may function to define a path that the mobile additive manufacturing apparatus follows in its process. In other examples, the path itself may be figured into the design of a desired topography. For example, in some examples it may be necessary for the mobile additive manufacturing apparatus (Addibot) to travel along a road surface and perform additive manufacturing based on aspects that it measures or determines of the surface as it travels. In other examples, the shape of a feature to be deposited across a surface may involve the control of the navigation system to move the Addibot to a location where the additive manufacturing element can further control the additive process. In these cases, the path of the Addibot could be arbitrarily complex based on a model that it follows to generate an end result.

Referring now again to FIG. 1, an additive manufacturing element 140 may be represented. The various techniques known in the art may be included as an additive manufacturing element including, for example, extrusion heads, stereolithography processing heads and material printing heads. An altered version of stereolithography may occur by the application of thin films of liquid material upon the surface which is then subsequently processed to create hardened surfaces. If the unreacted material is removed a subsequent application of liquid reactant can begin to build the next layer.

The material printing heads may have a wide diversity in characteristics. Printing heads with very fine resolution may be utilized. As an example, a printing head may have rows of print heads that have an orifice size such that a roughly millimeter sized droplet may be formed. Such a droplet may have a volume of roughly 10-100,000 times that of a droplet from a 1:1000 resolution. The volume of a millimeter diameter droplet may have an estimated volume of about 0.4 microliters. In other examples larger volumes of material may be printed with heads that have gross resolution.

In some examples, the additive process can relate to an element such as a print head depositing droplets of material over the surface to build structure. In stereolithography, an energy source is used to convert the liquid to a solidified material, but in these other examples, the droplets of material may either react with the surface or solidify by other principals such as by cooling for example. Combinations of droplets of different material may also result in reactions that result in solidified material.

The additive manufacturing element may also function to add material that changes color or pattern or other physical properties in select regions. A version of this type of additive manufacturing may occur when powders are deposited in the additive process. The powder may create lines or other demarcations. In some of these examples, a subsequent sealing of the powder form may be deposited by another additive manufacturing process.

In some examples, the additive manufacturing element may be an energy source such as a laser, ion beam or the like. The energy source may be used to cause liquid material to solidify in defined regions. The liquid material may be added by the Addibot or be present by other means. As an example, an Addibot may ride upon a transparent surface that may sit above a liquid reservoir of relatively arbitrary size. An Addibot with a laser may ride upon the transparent surface and irradiate the surface layer of the reservoir in desired locations. After a layer is processed, the work material beneath the transparent surface may be moved away from the transparent surface by a layer thickness and the Addibot may again move around on the transparent surface irradiating through the surface to image polymerizable material beneath.

The various additive manufacturing elements that may be used in these manners comprise the art that is consistent with mobile automated additive manufacturing.

An additive manufacturing element 140 may be part of the mobile additive manufacturing system. There may be numerous types of additive manufacturing elements consistent with this type of system. For example, in some examples, the material to be added may be found in a liquid form either in its nascent form or in a processed form. The liquid material may be processed by droplet ejection printing schemes. Some printing elements may be comprised of MEMS jet printing elements. In other examples, the printing element may be composed of an array of valves that open and close to dispense controlled amounts of the liquid. In still further examples, a liquid stream may be controlled by the presence of mechanical shunts which do not allow a stream of the liquid to be released below the element. In fact any liquid control mechanism, typically deployed in an array of elements, which may allow for a spatial control over the dispensing of the material, may comprise an additive manufacturing element for liquids in a mobile additive manufacturing system In FIG. 1, a material storage system 150 may be found. As has been described there may be numerous types and forms of material that may be processed by an Addibot. In some examples, materials in filament form may be used; in other examples liquids of various kinds may be employed. And, in still further examples, solids such as powder form materials may be utilized. In each of these cases, there may be numerous material options within a particular kind. There may be standard ABS plastic filaments or other plastic filaments. In some examples, other fibers such as fiber class filaments may be utilized in composite processing such as with epoxy resin combinations with fiberglass filaments. In the liquid form a great diversity of materials may be used including resins, photoactive and thermoactive materials. Other materials in the liquid form may be a solid at an ambient condition but may be processed by the additive manufacturing system at conditions that make the material liquid. The powder form examples may be thermo-active and photoactive materials or alternatively may be materials that in combination with other deposited materials cause a reaction to occur resulting in a deposited solid material. In the state of the art, metals, insulators and ceramics to name a few materials may be formed by the processing of powder form materials. In other examples, the powder deposited will remain in a powder form on the surface.

In the various materials examples that may be possible with an Addibot, the environmental storage conditions on the Addibot may be important. Accordingly the material storage system 150 may have controls over numerous environmental conditions such as the temperature of the material storage, the pressure, the ambient gasses or a vacuum condition and the humidity to mention some examples. Thus, the material storage system for an Addibot would have control systems for the important environmental conditions. The storage system would need to allow for the automated or non-automated replenishment or replacement of the material that is located in an Addibot. In some examples various combinations of multiple material storage systems may be present. For example, a powder storage system and an additive manufacturing element for powder forms may be combined with a liquid storage system and an additive manufacturing element for liquid forms upon the same Addibot system. In still further alternative, two different forms of material may be combined with different storage systems that feed a single additive manufacturing element that is designed to simultaneously process the two material types.

Other examples may have additive manufacturing elements to disperse solids. The element may extrude elements of material that may be gelled to allow for the material to be formed by the additive manufacturing head. The extrusion elements may also deposit small pieces of extruded material that is in a gelled or partially melted form. The extrusion elements may have heating regions to melt material. Lasers or other high energy sources may cut the small pieces from the extrusion print head as it is being extruded. In other examples, the material is not cut as it is formed into three dimensional shapes.

Solids may also be dispersed in powder forms. The powder may be carried in a solvent as an emulsion that may be dispersed in manners that liquids may be dispersed. In other examples, the powders may be controlled by valves or shunts as it is dropped or impelled onto the surface.

In some examples, a solid may comprise a mixture of various components such as an aggregate and an asphalt binder. The solid may be stored in a continuous filament or in a filament with discrete large segments, much as a string of sausages as a non-limiting example. In some examples, discrete solid pieces may be controlled by a dispensing element.

The various materials that are added to the surface may be further treated to form a solidified surface. In some cases materials may be treated with light or other energy to heat or otherwise react the materials to form a solidified result. In other cases a chemical reaction may be caused to occur by the addition of a second material. In such cases the additive manufacturing element may be comprised of control elements to disperse liquids and solids or multiple liquids. In addition, the system may include the elements to post process the material such as by thermal or photochemical action. These post processing elements may be located on the additive manufacturing element, or may be located in other portions of the system. In some examples, the post processing may also include processes to wash or clear the surface from materials that are not solidified, adhered or attached to the surface. These processes may include processing to remove solid, powder or liquid material remaining on the work surface such as vacuuming or sweeping. The removed material may be recycled into the material storage system or may be moved to a waste receptacle. In similar fashion the post processing steps to remove material may be performed by elements that are included on the additive manufacturing element or additionally be other elements that are included in the mobile additive manufacturing system.

The results of the various additive processes may be measured by various manners to verify the conformity of the result to a modeled surface topography. An inspection system or a vision system 160 may perform these measurements to control the results. In some examples, the surface may also be studied with a similar or identical metrology element to determine the presence of topography. Another way of looking at such a measurement before the additive manufacturing step may be to examine the surface for defects, cracks or fissures that may need to be processed to form a flat surface for example. Therefore, the vision system 160 may in fact occur multiple times in the system. A pre-measurement may be performed by a first measurement element and a post processing measurement may be performed by a second measurement element. There may be numerous manners to measure the surface topography. As an example, a light or laser based metrology system may scan the surface and analyze the angle of reflected or scattered light to determine topography. Similar scanning systems based on other incident energy like sound or electromagnetic signals outside the visible spectrum like infrared or UV radiation, for example, may be used.

A different type of metrology system may result from profilometry where an array of sensing elements may be pulled across the surface and be deflected by moving over changes in topography of the surface. An array of deflecting needles or stylus may be dragged over the surface. In an alternative example, a pressure sensitive surface may be pulled over the surface under study.

The surface that the mobile automated additive manufacturing system acts on may have movable defects that exist on it. This may be commonly classified as dust or dirt for example. An element for preparation of the surface 170 may be located in an Addibot. In some cases, the material may be removed by a sweeping or vacuuming process that moves the particles into a region that removes them from the surface. Other methods of removal, which may replace or supplement the sweeping or vacuuming, may include pressurized gas processing which may "blow" the surfaces clean. There may also be electrostatic processes which charge the particles with electric charges and subsequently attract them to charged plates which attract the particles away. A cleansing process may also comprise a solvent based cleaning process which may subsequently be removed in manners mentioned earlier, in a combination of the Addibot techniques. A first Addibot may function to pretreat a surface in a variety of manners while a second Addibot performs a topography altering additive manufacturing process.

Another element, a communication system 180, of the mobile additive manufacturing system may be found referring to FIG. 1. In general, Addibots may be used in combinations to perform functions. To effectively perform their function it may be important that the Addibots may be able to communicate with each other. The communication system may also be useful for communication between the Addibot and a fixed communication system. The fixed communication system may be useful for communicating various data to the Addibot as well as receiving data transmissions from the Addibot. The data transferred to the Addibot may include programming software or environmental target files or the data may include environmental data such as mapping data or topological data as examples. The communication may be carried by RF transmission protocols of various kinds including cellular protocols, Bluetooth protocols and other RF communication protocols. The communication may also utilize other means of data transfer including transmissions of other electromagnetic frequencies such as infrared and optical transmissions. Sound waves may be useful for both communication and spatial mapping of the environment of the Addibot. In some examples the Addibot may be tethered to at least a communication wire that may be useful for data transmission.

Another form of communication may relate to visual based information conveyed by the Addibot body itself. In some examples, the Addibot body may include a display screen to communicate information to the surroundings in the form of graphic or visual data. As an example, the display can warn people in the environment of the Addibot as to the function that the Addibot is performing and when and to where it may move. Audio signaling may comprise part of the communication system in addition. As well, the Addibot may be configured with a light system that can project visual signals such as laser patterns, for example.

The communication system may be useful to allow external operators to provide direction to the Addibot. The directions may include the control of navigation in both a real time and a projective sense. Users may utilize the communication system to provide activation and deactivation signals. Numerous other functional control aspects may be communicated to control operation of the Addibot other than just the transfer of software programs including for example activation and control of the various subsystems.

A Power and Energy storage element 190 may be found within the mobile additive manufacturing system. In some examples, an Addibot will be tethered with a wire. The wire may be used for a number of purposes including providing power to the Addibot drive system or to an energy storage system within the Addibot. In many examples, the Addibot will operate in a wireless configuration, and therefore, will contain its own power system in the mobile platform. Standard combustion engines and hydrocarbon fuels may comprise a power system along with a generator driven by the engine to charge batteries as an electric charging system. In other examples, a battery powered system may power both the drive system with electric motors as well as the electronics and other systems. The battery storage system may be recharged during periods of non-use and the components of such a recharging system may comprise portions of the power and energy storage element. In some examples where the Addibot operates in an automated fashion, the recharging of the energy storage element may also occur in an autonomous fashion whether it is recharging electrically or obtaining additional fuel stores.

Exemplary Structure of an Addibot

There may be numerous manners to configure the novel mobile additive manufacturing system that has been described. In the following examples, non-limiting examples are provided as examples of the different manners that the Addibot apparatus type may be utilized. In particular, in the next example related to FIG. 2, 200 reference and description will be made to an Addibot that is configured for Surface liquid Deposition. The additive manufacturing functions of such an Addibot may provide a good example for the various systems and components in some Addibots. The example is provide to give a perspective in this disclosure of supportive systems that may be present for other types of exemplary Addibots such as for wall building and roadway construction and repair as non-limiting examples.

Figure 2:
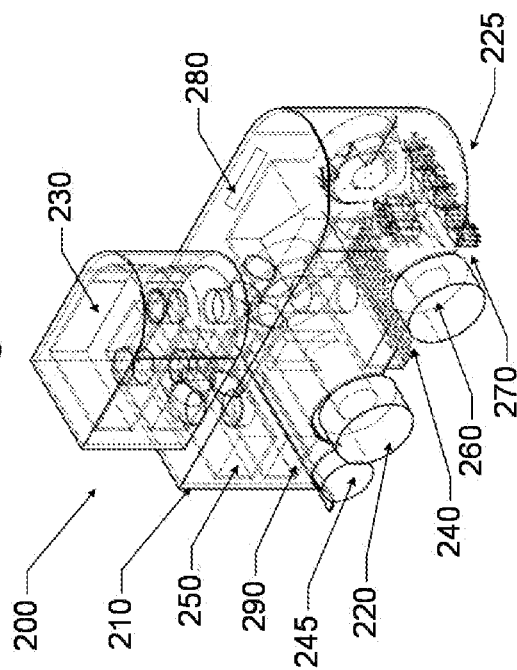
FIG. 2 illustrates a perspective view of an exemplary Addibot that may be useful for Additive Manufacturing Surface Treatment.

Referring to FIG. 2, 200 an example of an Addibot configured for Surface Fluid Deposition may be found. The chassis 210 of the Addibot may contain and support the systems of the Addibot in a mobile and autonomous manner.

The drive system 220, and drive flexible wheel 225 of this example may be exhibited. The depiction provides an example of one possible drive system using three wheels. An example using 4 or a different number of wheels or other such motive elements such as tractors and point contact elements such as spiked wheels, may also be within the scope of the inventive art herein. The drive system may be constructed, though, in a manner in which it does not interact with the other Addibot systems, for example, the vision system or the additive manufacturing element system. In some examples, the drive system and some other systems may be separate from the additive manufacturing element system. Depending on how the wheels of the drive system 220 are powered, they may also be part of the navigation, control and sensing system. Based on the input from the vision system (as a part of the navigation control and sensing system) the wheels may direct the Addibot to its desired path, in a fashion that is either autonomous or predetermined, depending on the orientation and number of the wheels.

A sensing element 230 may be depicted. This element may be used to perform functions necessary in the navigation, control and sensing system for this example. The navigation functions could be performed through GPS, an element grid, or other manners as has been described relating Navigation, Control and Sensing system 130 of FIG. 1.

An additive manufacturing element 240, and a secondary additive manufacturing element 245 for this example may be shown. The additive manufacturing element 240, for this example, may be a material printing head, as described in reference to the additive manufacturing element of FIG. 1, which may dispense liquids, molten material, or mixtures of liquids and solids of a controlled size, as well as a controlled temperature (which may be controlled by the material storage systems). This element may function to execute a precise additive process of the material, based on input from the vision system. Another element, in this example, the secondary additive manufacturing element 245 may be a roller or other type of distribution apparatus that spreads or smoothens to a degree, material that was added to the surface.

Elements of a material storage system 250 of this example are shown. These components may comprise various elements that may be necessary for material storage within an Addibot. There may be numerous alternative designs and orientations of components that may be consistent with the function of an Addibot. For some examples, it may be important to include a surface material collection element which may be in part be filled from material outputted by the surface preparation system. A temperature controlled portion of the surface material processing element may be used to process collected material. Filtration or screening components may be used to filter out any undesired particles that may be collected during the process of the Addibot.

A primary material reservoir where fluids or mixtures may be contained, may be filled by an operator of the Addibot apparatus. Recirculation of materials collected during the surface preparation, if any, may also be directed to the primary reservoir. An environmentally controlled secondary material reservoir may also be used to keep the fluids or mixtures at a different storage condition than that used in the primary storage location, such as the temperature, pressure or other characteristic of the material. The filter system used in the surface material processing element could be any combination of ionizing plates, sieves, or other common filtration devices. These devices may be necessary for removing particles that may contaminate or otherwise interfere with the correct operation of the Addibot.

A vision system 260 for this example may be depicted as shown. This element may use a variety of methods such as those described in reference to vision system 160 of FIG. 1. These may include a laser scanner, sensitive extruding pins or brushes, sonar, or other such components as may allow for inspection of the surface to be processed or for determination of the topography of the surface. Alternative orientations may be possible including for example an orientation where a vision system may be placed behind the additive manufacturing element to perform a post-inspection of the surface, after the material has been applied. Among other purposes, the inspection may be used to verify the results of the addition process and to see if more or less material may need to be added.

A surface preparation system 270 for this example may be observed. In this example, it may be necessary to remove particles, dust, debris, fluids or dirt from the surface before it may impede the accuracy of the vision system in processing the surface topography. The surface preparation system 270 shown in FIG. 2 may include a pressurized air system, a brushing system, a vacuum system, and a scraping system or a combination of these. These systems may be used to remove undesired particles from the surface. Other particle removal systems, including ionizing plates, a sweeping broom, or other brush based devices, other types of vacuums or suction devices; high pressure gas treatments to blow surface debris into a collection region, among other systems may also be usable for this example of an Addibot.

A communication system element 280 for this example may be seen. This element may be used to carry out communication processes, either between other Addibots or an external user. These tasks may be carried out in manners consistent with methods described in reference to the communication system 180 of FIG. 1.

A power and energy storage system 290 may be depicted. This element may be a battery to power the example's electrical systems and motors, or a combustion engine to power the drive system which may also charge a battery system as non-limiting examples. The power system may provide mechanical energy to the drive system or may provide electrical energy to the drive system which may power engines that comprise portions of the drive system. Electrical energy from generators connected to combustion engines or from battery sources may be used to power substantially all of the electronic systems utilized throughout an Addibot. Other energy storage sources such as compressed air may also comprise acceptable solutions for energizing the operations of an Addibot.

Additive Manufacturing Element Arrays

Referring again to additive manufacturing element 240, an additive manufacturing element may be various types of material delivery systems controllable to dispense material in an electrically controlled manner. In some examples water may be dispensed, however, in general various materials can be dispensed to be added to a surface that the additive manufacturing robot proceeds over. In some examples, materials for the repair or building of roadway surfaces may be dispensed as non-limiting examples.

Figure 3A:
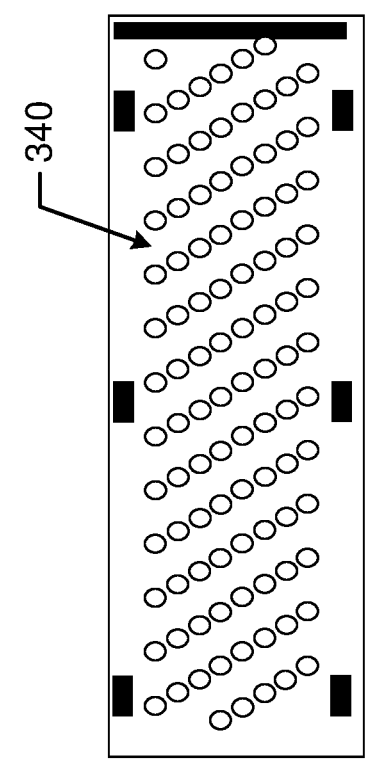
FIG. 3A-3D illustrates exemplary models of additive manufacturing deposition regions.

Proceeding to FIGS. 3A-3D, some examples of the configuration of arrays of dispensing elements may be found. The illustrations show arrays of dispensing elements such that the dispensing elements are located a locations at least along two dimensional axes, such as along two Cartesian coordinate axes. In some examples, there may be an offset of the height of the arrays from the plane of the illustration, therefore deploying elements along three dimensional axes. Referring to FIG. 3A an example is depicted of an additive manufacturing element 240 where the dispensing elements 320 may be ordered in a linear pattern where the dispensing elements are offset by one half of the inter element spacing from one line of elements to a subsequent line. In some examples, the additive manufacturing element 240 may be formed in such a manner to be a replaceable element in the additive manufacturing robot device. In some examples, the element may even be disposable. The additive manufacturing element 240 may be electrically activated and controlled. There may be numerous manners to arrange the electrical controlling systems and the electrical interconnects that attach to each of the dispensing elements 320. In some examples, there may a row and column manner of addressing each element. In other examples, each of the elements may have its own individualized interconnects.

In some examples, the additive manufacturing element 240 may have its own electrical control integrated circuits. For example, clusters of dispensing elements may be connected to control integrated circuits 310. In some examples, there may also be a second level of control electronics such as element control circuits 330. The electronics may receive control signals from numerous portions of the additive manufacturing robot. These signals may be coordinated among the various functional systems of the additive manufacturing robot such as the drive system 220 and systems that may move the additive manufacturing element 240 such as rastering the additive manufacturing element 240 perpendicular to the direction of drive system 220 motion. A movement in the additive manufacturing element 240 may allow for improved resolution in the location of added material, for example. Control systems in the various elements of the Addibot may interact with each other or with a system wide control system for the Addibot. These control systems may coordinate and control signals to the additive manufacturing element 240 that may then result in individual control to elements in the various array types. There may be numerous design examples to control an array of dispensing elements.

Figure 3B:
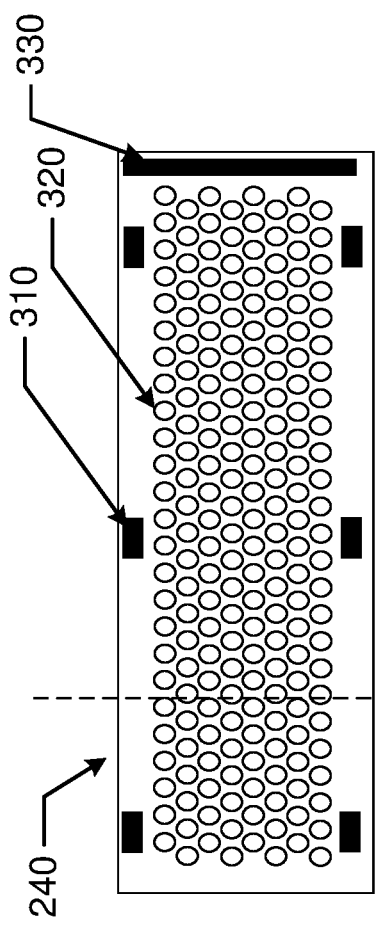

Proceeding to FIG. 3B, another example layout of dispensing elements may be found. In this example, rows of dispensing elements 340 may be arranged with offsets along the row of a fraction of the inter-element spacing. As the Addibot proceeds in a direction or as the entire additive manufacturing element is moved in space along the direction of Addibot movement and also perpendicular to that motion, such an off set of elements may allow for rapid deposition with relatively high resolution of deposition. In some examples, a complex control scheme may combine controlled directional movement of the entire Addibot with controlled motions of the Addibot's additive manufacturing element and then the control scheme may calculate through algorithmic calculation, the precise timing of the activation of each element.

Figure 3C:
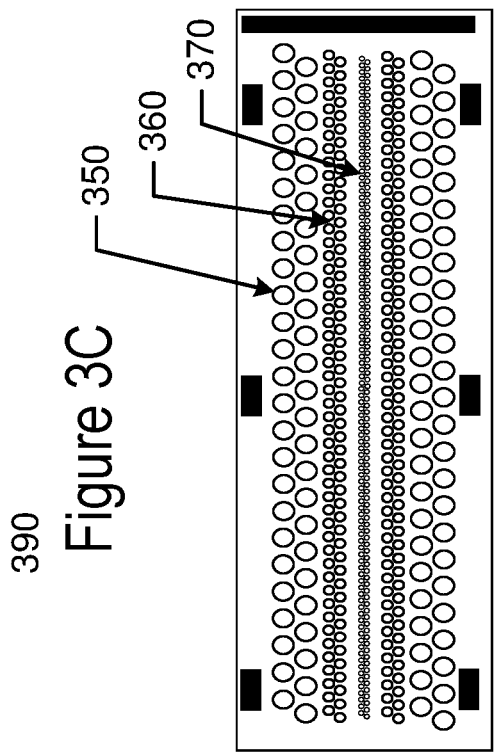

Referring to FIG. 3C, an example is depicted of an additive manufacturing element where different sizes of dispensing elements may be included. For example a relatively large element 350 may be found. In some examples, such a large element may dispense droplets or amounts of material that may cover roughly a square centimeter for example. A medium sized dispensing element 360 may be organized on the additive manufacturing element as well. As a non-limiting example such a medium size may cover roughly a tenth of a square centimeter area. Although there may be numerous sized dispensing elements combined, in the example a third sized element depicted as a small dispensing element 370 may be found.

Figure 3D:
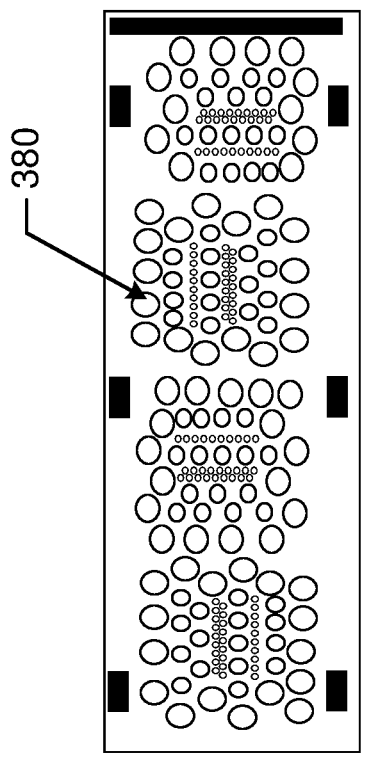

Proceeding to FIG. 3D, an example is depicted of an additive manufacturing element where a distribution 380 of sizes of dispensing elements are found and are organized in relatively complex patterns.

In FIG. 3A, a line 390 is found that references a direction along which a cross section may be depicted. When a cross section is made along the line 390 and through a dispensing element, representations of the element structure may be presented, as will be in following figures. Proceeding to FIG. 4A an example of a cross section through a dispensing element may be found. In the depiction, a reservoir 410 of material to be dispensed by the Addibot may be found. In some examples, the material may be pressurized in various manners. In some examples, pneumatic chambers may be used to control the pressure applied unto the dispensing element. The process of dispensing material, while controlled electrically and algorithmically, may be considered a relatively random process with respect to an individual dispensing element and its neighboring dispensing elements. As variations occur in which dispensing elements are activated, it is desirable that the processing conditions of various kinds, such as in a non-limiting perspective the pressure of material within the dispensing element, relating to a single dispensing element are as controlled and as constant as can be obtained. In some examples, each dispensing element may have its own pressure control and generation means.

Referring to FIG. 4, a generic material dispensing element may have a source of material 410, a valve mechanism 411 of some kind which may result in release 412 of the material. The valve may comprise an electroactive polymer as discussed in further detail, or it may comprise pneumatic, electrical, magnetic or electromagnetic actuator elements or other actuators which may regulate material movement.

Referring to FIG. 4A a material container 420 may contain the reservoir and in some example may have channels or nipples that proceed through a dispensing element. The material may then flow along the container surface and be dispensed as droplets 480 in some examples as the dispensing element is controlled in on and off modes.

In a non-limiting example, the electrically controlled aspect of the dispensing element may be achieved through the use of electrically controlled expansion or contraction of thin sheets of material. In an example, a sheet of elastomeric material may have activating elements on its surface that stretch or relax the elastomer with application of electrical potential. In a relatively simple version, electrodes across the thickness of the elastomer may be used to compress the elastomer which in turn may relax the elastomer. In such an action, the relaxation may compress the nipple 470 of the container and limit the flow of material through the material in either a direct or indirect manner. In FIG. 4A such an indirect manner may be depicted. Electrodes 430 and 431 may form a first pair of electrodes across an elastomeric film which in turn may be fixedly connected to a second elastomeric orifice at orifice 440. Stretching of the elastomer connected to electrodes 430 and 431 may be activated by electrical potential or the lack of electrical potential across the electrodes. In a non-limiting example a silicone based elastomer film may be stretched to have a relative uniform thickness of roughly 10 to 100 microns is obtained. The elastomer may be attached to various support locations to maintain its stretched level. Adhesives may be utilized to attach the support locations to the elastomer, or in some examples, the elastomer may have a self-adhesive property. Electrodes may be deposited upon the top and bottom surface of the elastomer. The electrodes may also be attached to electrical interconnects that may be insulated from the elastomer in various manners. The elastomer may be attached to another elastomeric element such as orifice 440. The orifice 440 may have a hole through its body and may be attached with adhesive to the elastomer layer in reference to Electrodes 430 and 431. A second similar layer of elastomer may be adhered to the other side of the orifice body. The second layer of elastomer may have corresponding electrodes 451 and 460. In some examples, relaxation of the elastomer layer on either the side with electrodes 430 and 431 or electrodes 451 and 460 may be sufficient to close off nipple 470 from material flow. In such cases some examples may organize the top and bottom elastomer layers in word line and bit line type of orientation such that a single line of material dispensing may occur with the control of the word line and the simultaneous "writing" of electrical signals to the bit line positions. In the example of FIG. 4A if both the top electrode pair and the bottom electrode pair have high electrical potential across them, the elastomer may be relaxed such that the nipple is closed off. When the electrical potential is removed across both the top and bottom electrode pairs, the elastomer may expand across its thickness and then have corresponding retraction in the plane of the elastomer creating stretching force across the orifice 440 and opening it sufficiently such that a droplet 480 of material may be expelled before one or both of the bit lines and word lines electrical potential may be restored to relax the respective elastomer layer respectively.

Proceeding to FIG. 4B an alternative manner of action may be depicted in reference to a similar arrangement of elastomeric layers. In some examples, multiple elastomer layers such as layer 492 and layer 493 may be used to provide tension to an active orifice 494. There may be numerous types of active orifices, such as electroactive elastomer based orifices, electroactive memory metal orifices, piezoelectric based orifices, electromagnetic based orifices or other electrically activated orifices. The active device is represented by electrodes 490 and 491 across the body of active orifice 494. In some examples, movement of an orifice sealing piece may be activated in a manner such as that performed with automobile fuel injectors through an electrical signal. Referring again to FIG. 4B, the reservoir 410 with material that may be deposited may reside in a material container 420 with a nipple 470. The active orifice 494 may control flow of the material through the nipple by expansion and contraction or by movement of a sealing mechanism such that when the deposition element is active a droplet 480 may flow.

Proceeding to FIG. 5 a depiction of an example of a top view of a dispensing element may be found. The electrode 430 may be depicted in an annular circular form. In some examples, the electrode may have a continuous connection as depicted with connection 510. The layer of elastomer that the electrode 430 sits upon may itself sit upon the orifice 440 as depicted by the dotted line for the external extent of the orifice piece. A hole 530 in the orifice may be depicted and may also be a hole made into the elastomer layer. Beneath the elastomer layer a second electrode may be found in the same shape as electrode 430. In some examples, the electrical connection to the second electrode may head in a different direction as depicted by connection 520. The connection 520 is depicted with a dotted line since the electrode may be located beneath the elastomer layer.

Figure 6:
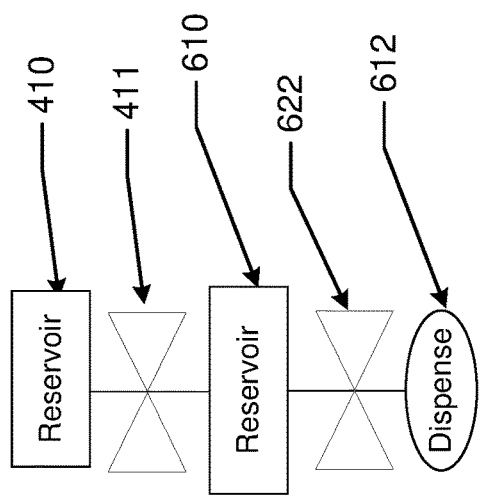
FIG. 6 illustrates an example of one material emission device from the exemplary deposition regions where multiple occurrences of sheets of material have electrodes on their surfaces.

Proceeding to FIG. 6 a depiction of a relatively more complex element that may be called a compound dispensing element may be found. A generic material dispensing element may have a source of material 410, a valve mechanism 411 of some kind which may result in release into a dosing reservoir 610. A second valve 622 may allow for a dispense 623 of the material. Such a valve mechanism may allow for the entire AMArray to be loaded up with material, such that each element's dosing reservoir contains material. Then between such refresh cycles the material can be dispensed when appropriate. The valves may comprise an electroactive polymer as have been discussed, or they may comprise pneumatic, electrical, magnetic or electromagnetic actuator elements or other actuators which may regulate material movement.

Figure 6A:
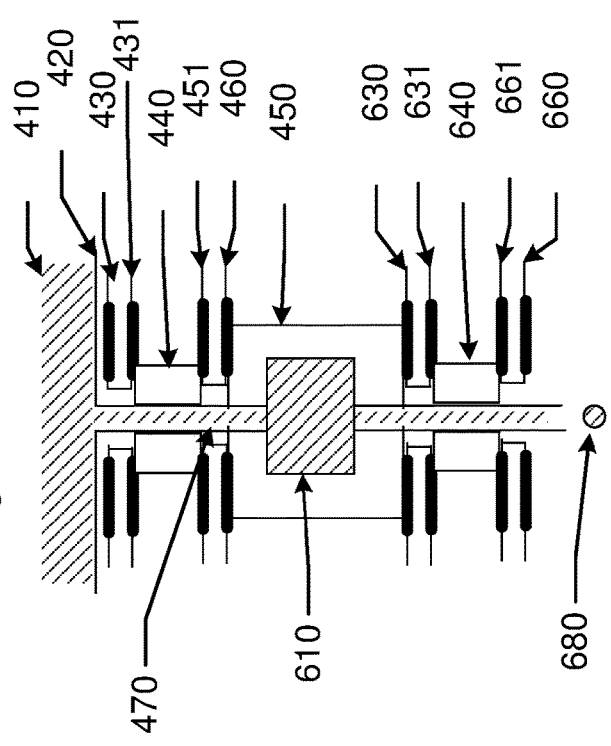

Referring to FIG. 6A, a structure related to that depicted in FIG. 4A may be found with the same reference elements indicated in the top portion of the device depicted. A similar structure is shown at the bottom of the device. Electrodes 630 and 631 may surround a third elastomer level while electrodes 660 and 661 may surround a fourth elastomer level. These layers may interact with an orifice 640. The orifice may be passive as depicted or active as was shown in FIG. 4B. In between the compound structures may be a reservoir element 450. The element may be comprised of an elastomeric body surrounding a cavity 610. The nipple structure may be able to expand into the cavity in some examples or may feed into the cavity and out of the cavity separately. The purpose of the cavity may be to create a metered amount of material that may exist under pressure.

The dispensing element at orifice 440 may be opened when orifice 640 is closed. This may fill and pressurize the cavity to an operating pressure. Dispensing element of orifice 440 may then close. The next time that orifice 640 is activated a droplet 680 of material may be dispensed and then the orifice 640 may then be closed. The dispensing element at orifice 440 may again be activated to recharge the cavity 610 to a volume and pressure.

Figure 7:
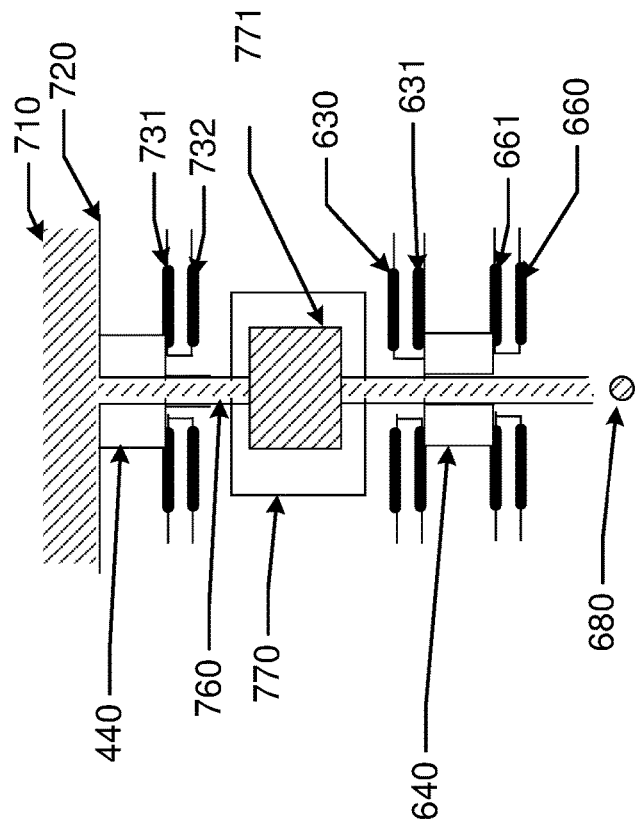
FIG. 7 illustrates another example of one material emission device from the exemplary deposition regions where multiple occurrences of sheets of material have electrodes on their surfaces.

Proceeding to FIG. 7 a simplified version of the compound dispensing element may be found. The element may include a reservoir 710 that may be pressurized and a container 720 that may have a nipple 760 and a metering element 770 with a cavity 771. The simplified version may have only a single layer of elastomer in the dispensing element that opens the reservoir to the cavity. In some examples, the dispensing of material from an additive manufacturing element may include a series of steps where refiling of the cavity structure is performed while all lower dispensing elements are in an off or non-flowing condition. Therefore, all cavities may be opened at the beginning of every cycle for a period of time to sufficiently charge the cavities. It may be practical to only include one elastomer layer in such examples. There may be various combinations of the concepts as have been discussed, for example, electroactive orifices may be employed in examples where non electroactive orifices have been depicted or other such replacements or combinations may be utilized.

Methods

Figure 8:
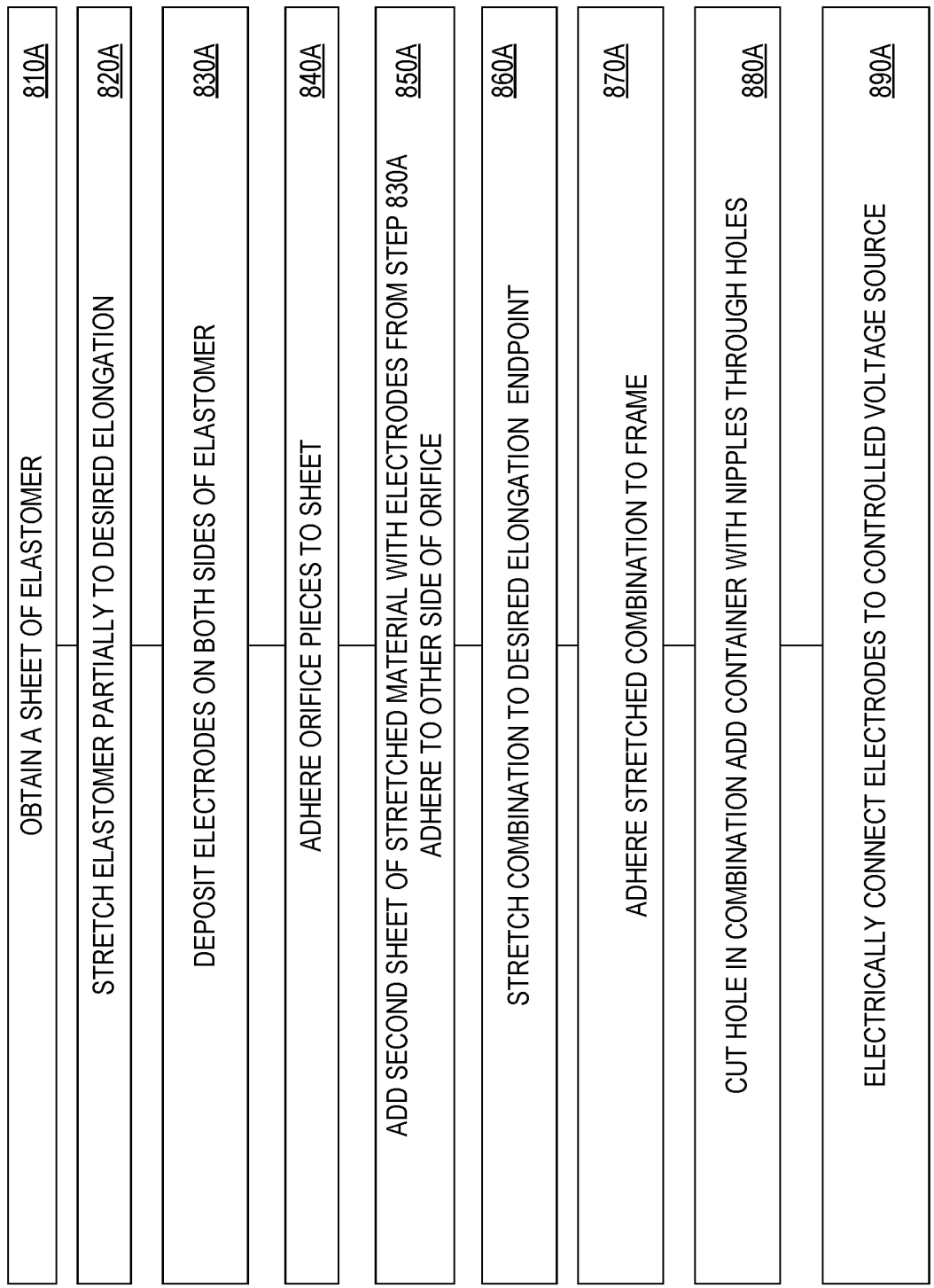
FIG. 8 illustrates exemplary methods related to production of material dispensing elements.
Figure 9:
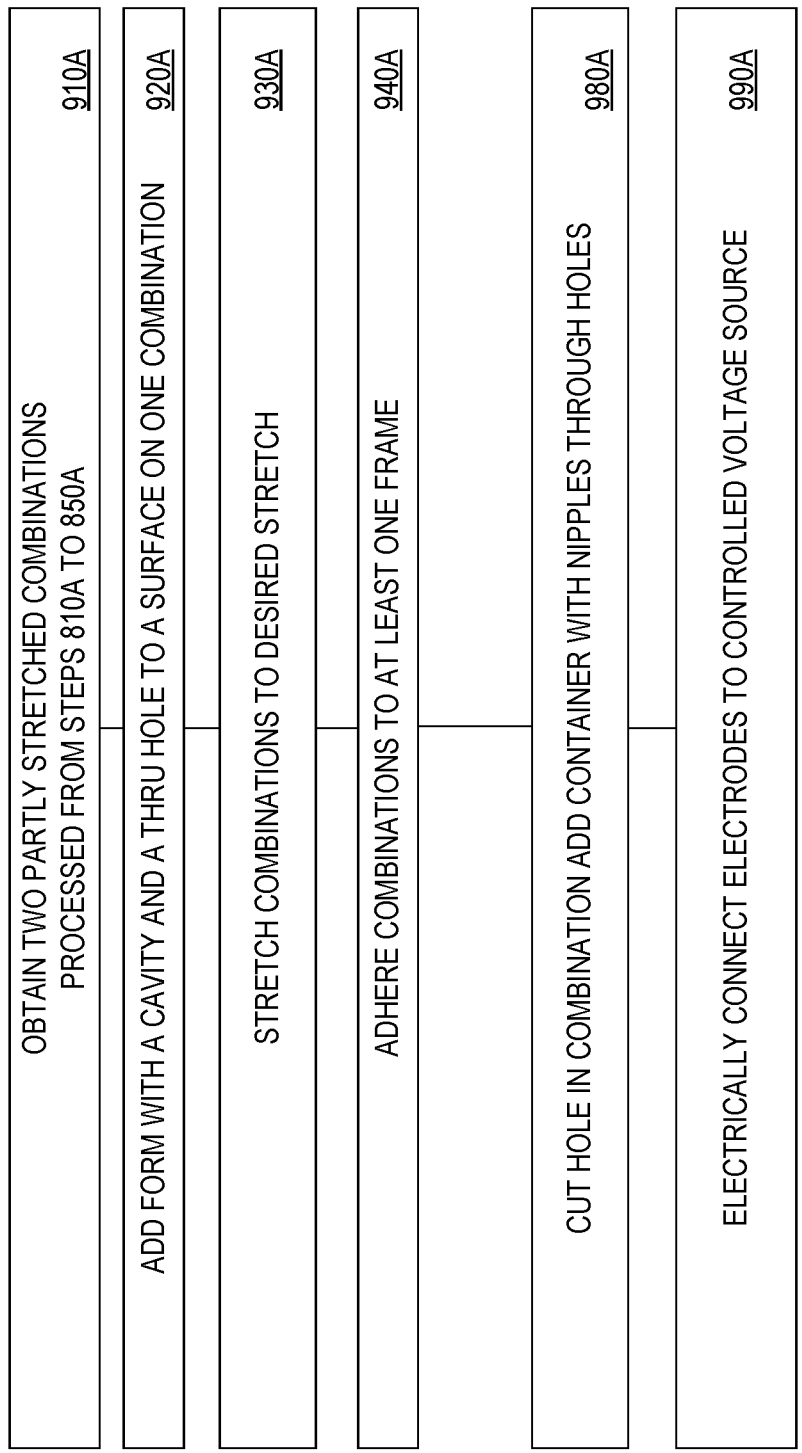
FIG. 9 illustrates exemplary methods related to production of additional types of material dispensing elements.

There may be numerous methods of utilizing the additive manufacturing element of an Addibot, manufacturing the additive manufacturing element of an Addibot. Referring to FIG. 8 and FIG. 9, an exemplary set of method steps that may be commonly utilized to create dispensing elements for an additive manufacturing element may be found. The steps are displayed in a flow chart for example. The steps may flexibly be used or not used and the order of the steps may be changed within the scope of the inventive art of Addibots.

Referring to FIG. 8, at 810A, a sheet of elastomer may be obtained by a user. Next, at step 820A the user may stretch the elastomer to an intermediate of stretching. At 830A, electrodes may be deposited upon the stretched elastomer layer. At 840A orifice pieces may be adhered to the sheet of elastomer. In some examples, the orifice pieces may be attached in a single preformed layer that aligns to the stretched elastomer dimension and aligns the orifices to the electrodes. The process steps from 810A to 830A may be repeated to create a second sheet of elastomers with electrodes which may be adhered to the other side of the array of orifice pieces at step 850A. The combination of first and second sheets of elastomer and the attached orifice pieces may next be stretched an additional amount to a fully elongated endpoint 860A. The stretch film may next have a frame adhered to the film in regions surrounding the individual orifice regions at step 870A. The frame will freeze the elastomer into its stretched shape and support the elastic forces within unit cells of the frame which correspond to each dispensing element. At step 880A a hole may be cut through all the films and layers in the center of each dispensing element. And a container with nipples may be added through the holes. At 890A when a controlled voltage source is electrically connected to the electrodes stretching in the elastomer may be controlled and operate opening and closing of the dispensing device.

Referring to FIG. 9, at step 910A two versions of the result of the processing depicted in FIG. 8, from steps 810A to 850A may be obtained. A form with a cavity and a hole penetrating the form through the center of the cavity may be added to one of the combination elements at 920A. The cavity and hole may be aligned so that the through-holes are collinear with holes at respective dispensing element features on the two combinations of elastomeric films. The second combination may be added upon the form with the cavity. The combinations together may be stretched to a desired stretch at 930A. The resulting combination may be attached to a form or more than one form to hold the layers in place at 940A. A hole through all of the layers may be cut, if the holes are not already present in the combination of layers. Next a container with nipples may be added to the combination at step 980A where the nipples are placed through the hole. In some examples a specialized form of nipple may be formed into the container where a thin elastomer portion of the nipple may be located where the nipple will sit within the cavity within the form that lies in the center of the form. This region will allow for expansion when the fluid within the cavity is pressurized. At step 990A electrodes may be electrically connected between the various electrodes and controlled voltage sources. In some examples various types of electrical connections may be carried through the forms to connect to the electrode portions of the elastomer layers. The forms have deposited electrical connects upon them or bundles of metals may be attached to the forms.

Control Systems

Figure 10:
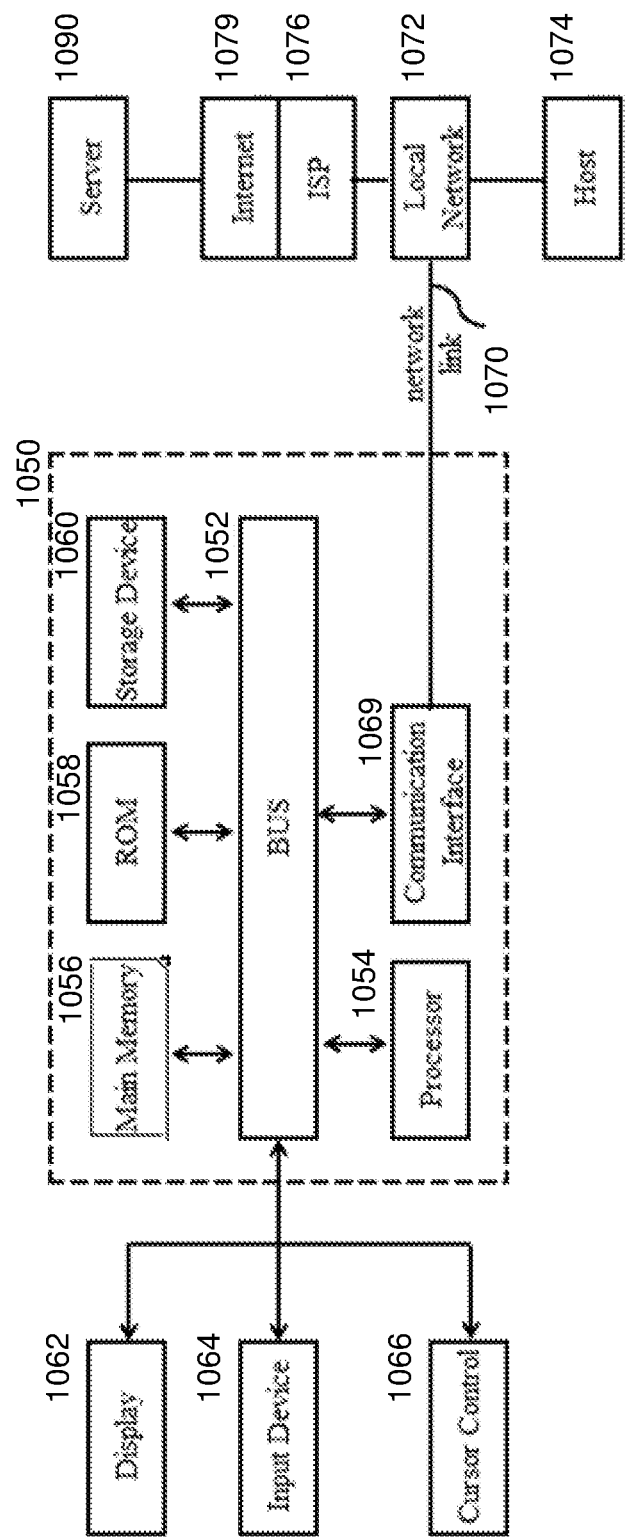
FIG. 10 illustrates a processor and controller that may be useful in various examples of Addibots.

Referring now to FIG. 10, additional aspects of controller hardware useful for implementing the present invention may be illustrated as a block diagram that may include a controller 1050 upon which an embodiment of the invention may be implemented. Controller 1050 may include a bus 1052 or other communication mechanism for communicating information, and a processor 1054 coupled with bus 1052 for processing information.

Controller 1050 may also include main memory 1056, such as a random access memory (RAM) or a dynamic storage device, coupled to bus 1052 for storing information and instructions to be executed by processor 1054. Main memory 1056 may also be used for storing temporary variables or other intermediate information during execution of instructions to be executed by processor 1054. Controller 1050 may further include a read only memory (ROM) 10510 or other static storage device 1060.

Controller 1050 may be coupled via bus 1052 to a display 1062, such as a cathode ray tube (CRT) or liquid crystal display (LCD), for displaying information to a computer user. An input device 1064, including alphanumeric and other keys, may be coupled to bus 1052 for communicating information and command selections to processor 1054. Another type of user input device may be a cursor control 1066, such as a mouse, a trackball, a touchpad, or cursor direction keys for communicating direction information and command selections to processor 1054 and for controlling cursor movement on display 1062. This input device may typically have two or three degrees of freedom in two axes, a first axis (e.g., x) and a second axis (e.g., y), that allows the device to specify positions in a plane.

Some embodiments of the invention may be related to the use of controller 1050 for setting operational parameters. According to one embodiment of the invention, control parameters may be defined and managed by controller 1050 in response to processor 1054 executing one or more sequences of one or more instructions contained in main memory 1056. Such instructions may be read into main memory 1056 from another computer-readable medium, such as storage device 1060. Execution of the sequences of instructions contained in main memory 1056 causes processor 1054 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein may refer to any medium that participates in providing instructions to processor 1054 for execution. Such a medium may take many forms, including but not limited to, non-volatile media, volatile media, and transmission media. Non-volatile media includes, for example, solid state devices (SSD) or magnetic disks, such as storage device 1060. Volatile media may include dynamic memory, such as main memory 1056. Transmission media includes coaxial cables, copper wire and fiber optics, including the wires that comprise bus 1052. Transmission media may also take the form of infrared and radio frequency transmissions, acoustic or light waves, such as those generated during radio wave and infrared data communications.

Common forms of computer-readable media may include, for example, a memory stick, hard disk or any other magnetic medium, a CD-ROM, any other optical medium, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1054 for execution. For example, the instructions may initially be carried on a magnetic disk of a remote computer. The remote computer can load the instructions into its dynamic memory and send the instructions over a distributed network such as the Internet. A communication device may receive the data on the telephone line and use an infrared transmitter to convert the data to an infrared signal. An infrared detector may receive the data carried in the infrared signal and appropriate circuitry can place the data on bus 1052. Bus 1052 may carry the data, or otherwise be in logical communication to the main memory 1056, from which processor 1054 retrieves and executes the instructions. The instructions received by main memory 1056 may optionally be stored on storage device 1060 either before or after execution by processor 1054.

Controller 1050 may also include a communication interface 1069 coupled to bus 1052. Communication interface 1069 provides a two-way data communication coupling to a network link 1070 that may be connected to a local network 1072. For example, communication interface 1069 may operate according to the internet protocol. As another example, communication interface 1069 may be a local area network (LAN) card a data communication connection to a compatible LAN. Wireless links may also be implemented.

Network link 1070 may typically provide data communication through one or more networks to other data devices. For example, network link 1070 may provide a connection through local network 1072 to a host computer 1074 or to data equipment operated by an Internet Service Provider (ISP) 1076. ISP 1076 in turn may provide data communication services through the worldwide packet data communication network now commonly referred to as the "Internet" 1079. Local network 1072 and Internet 1079 may both use electrical, electromagnetic or optical signals that carry digital data streams. The signals may be transmitted through the various networks and the signals on the network link 1070 and through communication interface 1069, which carry the digital data to and from controller 1050 are exemplary forms of carrier waves transporting the information.

In some embodiments, Controller 1050 may send messages and receive data, including program code, through the network(s), network link 1070 and communication interface 1069. In the Internet example, a server 1090 might transmit a requested code for an application program through Internet 1079, ISP 1076, local network 1072 and communication interface 1069.

Processor 1054 may execute the received code as it is received, and/or stored in storage device 1060, or other non-volatile storage for later execution. In this manner, controller 1050 may obtain application code in the form of a carrier wave.

Access devices may therefore include any device capable of interacting with controller 1050 or other service provider. Some exemplary devices may include a personal digital assistant, a mobile phone, a smart phone, a tablet, a netbook, a notebook computer, a laptop computer, a terminal, a kiosk or other type of automated apparatus. Additional exemplary devices may include any device with a processor executing programmable commands to accomplish the steps described herein.

A controller may be a programmable board such as an Arduino board, and/or one or more of: personal computers, laptops, pad devices, mobile phone devices and workstations located locally or at remote locations, but in communication with the controller. System apparatus may include digital electronic circuitry included within computer hardware, firmware, software, or in combinations thereof. Additionally, aspects of the invention may be implemented manually.

Apparatus of the invention may be implemented in a computer program product tangibly embodied in a machine-readable storage device for execution by a programmable processor and method actions can be performed by a programmable processor executing a program of instructions to perform functions of the invention by operating on input data and generating output. The present invention may be implemented advantageously in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object oriented programming language, or in assembly or machine language if desired, and in any case, the language can be a compiled or interpreted language. Suitable processors may include, by way of example, both general and special purpose microprocessors.

Generally, a processor may receive instructions and data from a read-only memory and/or a random access memory. Generally, a computer may include one or more mass storage devices for storing data files; such devices include Solid State Disk (SSD), magnetic disks, such as internal hard disks and removable disks magneto-optical disks and optical disks. Storage devices suitable for tangibly embodying computer program instructions and data include all forms of non-volatile memory, including, by way of example, semiconductor memory devices, such as EPROM, EEPROM, and flash memory devices; magnetic disks such as, internal hard disks and removable disks; magneto-optical disks; and CD_ROM disks may be included. Any of the foregoing may be supplemented by, or incorporated in, ASICs (application-specific integrated circuits).

In some embodiments, implementation of the features of the present invention may be accomplished via digital computer utilizing uniquely defined controlling logic, wherein the controller includes an integrated network between and among the various participants in Process Instruments.

The specific hardware configuration used may not be particularly critical, as long as the processing power is adequate in terms of memory, information updating, order execution, redemption and issuance. Any number of commercially available database engines may allow for substantial account coverage and expansion. The controlling logic may use a language and compiler consistent with that on a CPU included in the controller. These selections may be set according to per se well-known conventions in the software community.

The controller 1050 may perform instructions of a program which may affect numerous algorithmic processes and thereby may operate in accordance with mobile additive manufacturing equipment. A storage device 1060 can also store Addibot related data in one or more databases. The databases may include specific control logic for controlling the deposition of material at each of the additive manufacturing components which may be organized in matrices, arrays or other collections to form a portion of an additive manufacturing system.

Arrays of Light and Energy Emitting Devices

Referring again to FIGS. 3A-3D, the patterns depicted may refer to locations of light and energy emitting devices. In the referenced matters of the application, Addibot models which emit light or energy rather than material directly have been described. For these various applications, there may be arrays of the light and energy emitters which may be organized in a device in the patterns depicted. In a specific example, FIG. 3A may depict laser emitting diodes, substantially of the same size organized in linear patterns. As the light emitting array equipped Addibot proceeds over a surface which may be a transparent surface above light sensitive chemicals, patterns of light may be emitted to create polymerized, or gelled shapes thereunder. Although light may refer to a visible spectrum of electromagnetic radiation, other wavelength regimes may be emitted by the devices in the pattern, including in a non-limiting sense ultraviolet, infrared and other spectral regions. Charged particle and pressurized gasses may also comprise energy emitting devices.

In other examples, the energy emitting devices which include lasers, pressurized air, pressurized air with abrasives and the like. May interact with a surface thereunder. The processing may clean or otherwise prepare the surface. In other examples, the treatment may emboss or engrave the surface in a programmable manner.

Electroactive Emitter Elements with Elastomeric Films

Figure 11A:
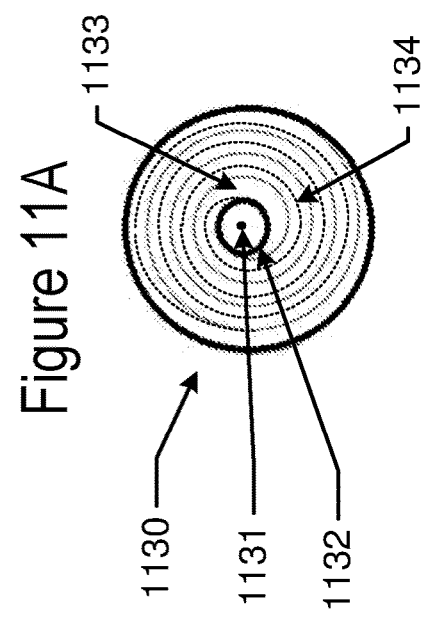
FIG. 11 illustrates another example of a material emission device with wrapped electroactive elastomer layers.
Figure 11:
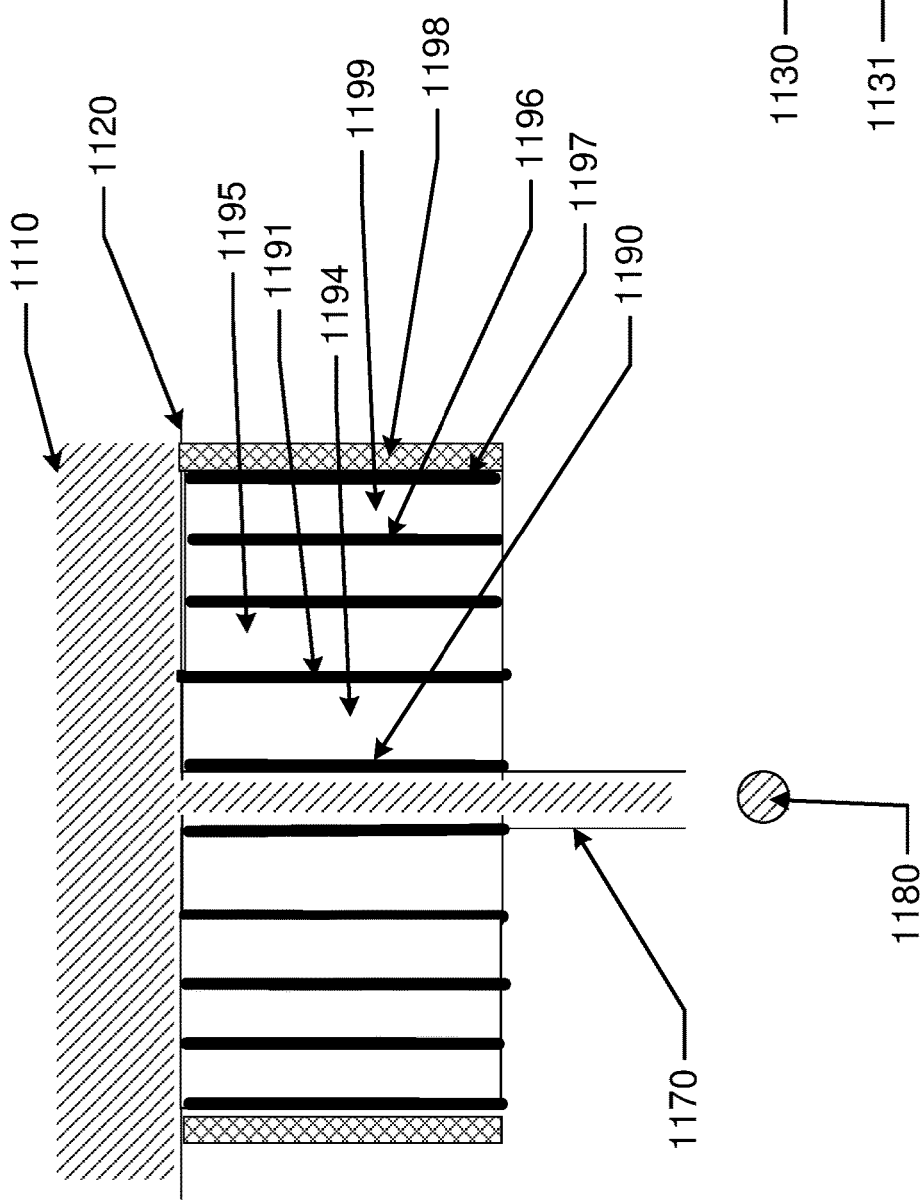

Proceeding to FIG. 11 an alternative manner of forming an electroactive emitter may be depicted in reference to an annular wrapped arrangement of elastomeric layers. Uses of an additive manufacturing element discussed previously may be performed by this alternative in some examples. An electroactive elastomer 1194 may be surrounded by electrode layers such as electrode 1190 and 1191. An insulator layer 1195, which in some cases may be another elastomer layer may separate electrode layers as they are annularly wrapped around the central orifice 1170. One layer of the wrapped active device is represented by electrodes 1190 and 1191 across the body of the active orifice of electroactive elastomer 1194. Referring again to FIG. 11, the reservoir 1110 with material that may be deposited as droplets 1180 may reside in a material container 1120 with a nipple or central orifice 1170. The electroactive elastomer 1194 may control flow of the material through the nipple by expansion and contraction. Additional wraps of the active material such as electrodes 1196 and 1197 around elastomeric material 1199 may additively contribute to contraction and expansion around the central axis (These layers are given a new number to identify additional wraps but they may be continuous therefore 1199 may be the same layer as 1194 for example). In some examples, a fixed layer 1198 may surround the device to maintain a fixed peripheral location; thus when the electroactive device contracts it will be pulled towards the fixed layer 1198.

Referring to FIG. 11A, a cross section 1130 of the electroactive actuator may be found. The nature of the spiral pattern from wrapping layers around a central point may be observed. A central cavity tube wall 1132 and internal wall 1131 may be observed where the compressed films around them have closed off an internal tube channel. The electroactive film with electrode layers 1133 may be wrapped in a single structure around the central cavity tube wall 1132. There may optionally be another dielectric film 1134, shown in dotted line type that separates electrode films from each other as the composite structure is wrapped.

There may be numerous elastomeric materials that may be used for the electroactive elastomer 1194. In some examples plasticized elastomers such as plasticized poly-vinyl chloride (PVC) may be used. There may be many plasticizers that may be used with PVC. An exemplary class of base materials that may be transformed into plasticizers may include aliphatic dibasic acids (examples may include succinic acid, adipic acid, pimelic acid, suberic acid, azelaic acid, sebacic acid, undecane-diacid, dodecane-diacid, tridecane-diacid, and docosane-diacid; or aromatic dibasic acids, phthalic acid and isophthalic acid). The base materials can be esterified with polyalcohols to get plasticizers with various properties. PVC plasticized with dibutyl adipate may provide an example elastomeric layer. In some examples, a solvated PVC solution, where a non-limiting exemplary solvent may include tetrahydrofuran THF or methyl ethyl ketone MEK may be mixed with the plasticizer, where a non-limiting exemplary plasticizer may include dibutyl adipate may be mixed in a ratio of 4 parts plasticizer to 1 part PVC, other dilutions may be possible.

Figure 11B:
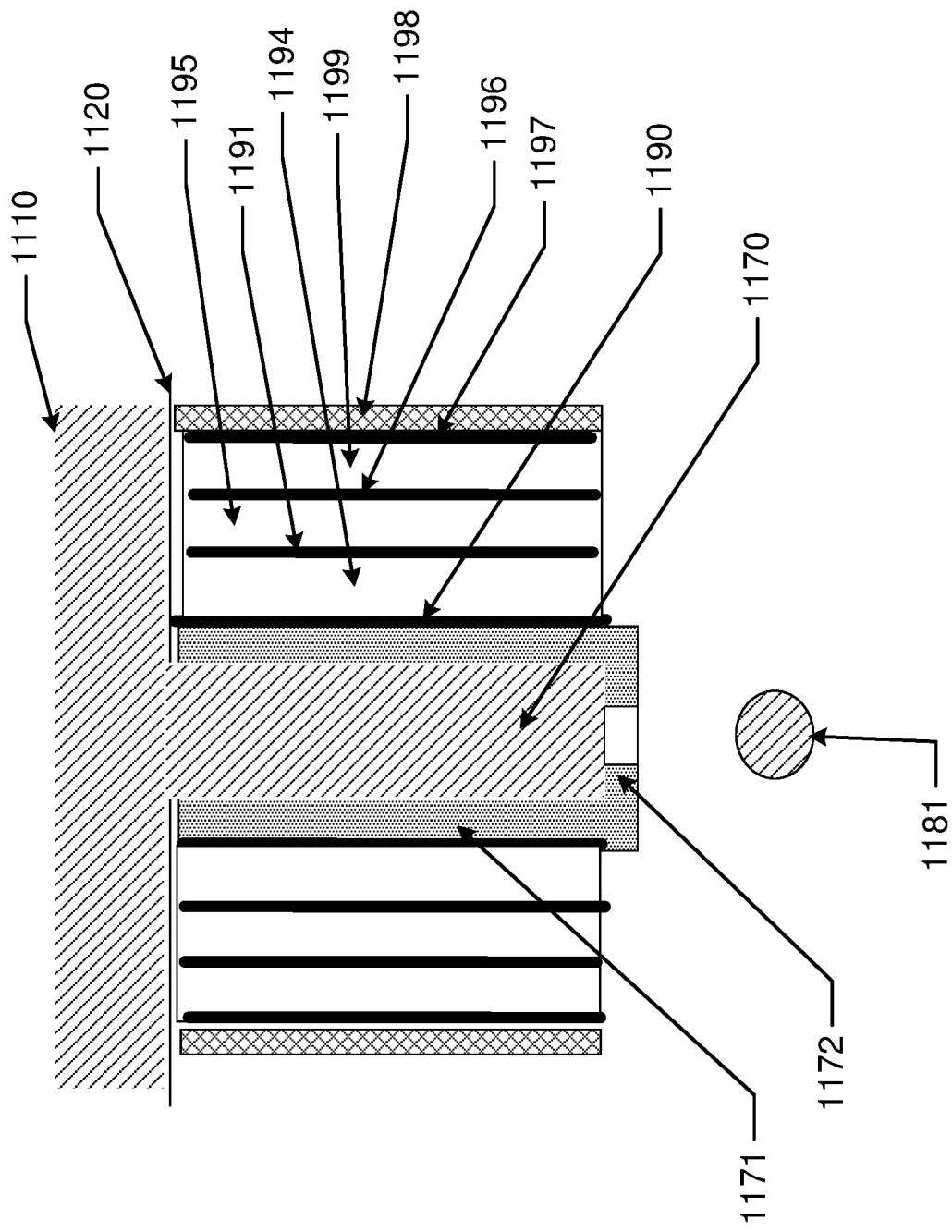

Proceeding to FIG. 11B an alternative manner of actuation an electroactive emitter may be depicted in reference to an annular wrapped arrangement of elastomeric layers. Uses of an additive manufacturing element discussed previously may be performed by this alternative in some examples. An electroactive elastomer 1194 may be surrounded by electrode layers such as electrode 1190 and 1191. An insulator layer 1195, which in some cases may be another elastomer layer may separate electrode layers as they are annularly wrapped around the central orifice 1170. One layer of the wrapped active device is represented by electrodes 1190 and 1191 across the body of the active orifice of electroactive elastomer 1194. Additional wraps of the active material such as electrodes 1196 and 1197 around elastomeric material 1199 may additively contribute to contraction and expansion around the central axis (These layers are given a new number to identify additional wraps but they may be continuous therefore 1199 may be the same layer as 1194 for example). In some examples, a fixed layer 1198 may surround the device to maintain a fixed peripheral location; thus when the electroactive device contracts it will be pulled towards the fixed layer 1198. In the example of FIG. 11B, the wrapped electroactive polymer layers may compress a fluid filled chamber 1171. The compressed fluid may act hydraulically a transfer force and volume of fluid to expand a flexible layer 1172 at the bottom of the additive manufacturing element. The expansions of the flexible layer 1172 may close off some or all of the internal chamber of the element. When the internal chamber is closed off a fluid flow may be blocked. In other examples, a solid material form 1181 may be blocked or released by the hydraulic action on the flexible layer 1172.

Figure 12A:
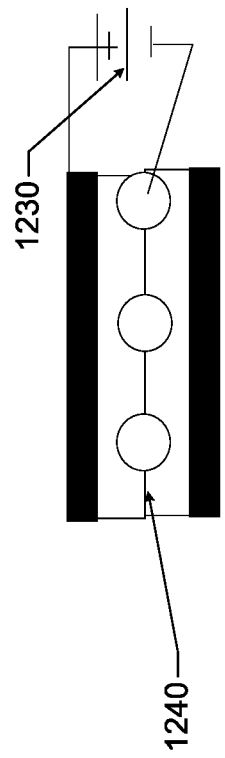
FIGS. 12A-B illustrate forms of elastomeric actuators based on structured electrodes with gaps.
Figure 12B:
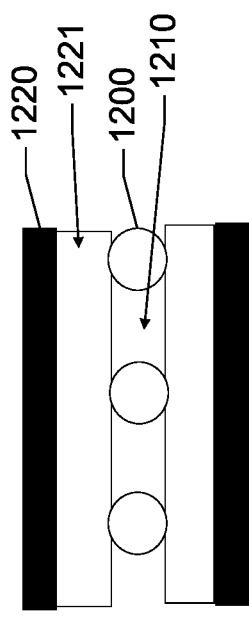

One or more of the electrode layers may comprise a mesh or step pattern such that voids in the combined elastomeric material and electrode structure may exist; when there is no field applied to the electrodes. Referring to FIGS. 12A and 12B an example mesh pattern electrode with elastomer layers are demonstrated. In FIG. 12A, the conductive mesh 1200 may be shown in cross section. A gap 1210 in the device may be found when no bias is found across electrodes 1220 and 1200 across the electroactive film 1221. When a bias 1230 is applied across the electrodes, the electroactive elastomer will deform in the region with electric field between the electrodes. The net effect will be thinning of the elastomer between the electrodes with elastic flow of material into the gap 1210 reducing the gap as shown at 1240. The overall effect will be a physical movement of the electrode layers towards each other. The resulting compressive stress may result in a change in state of an electroactive actuator which the material and electrode design may be used with. The application of voltage on the electrodes may open up a channel through which materials may flow.

Figure 13A:
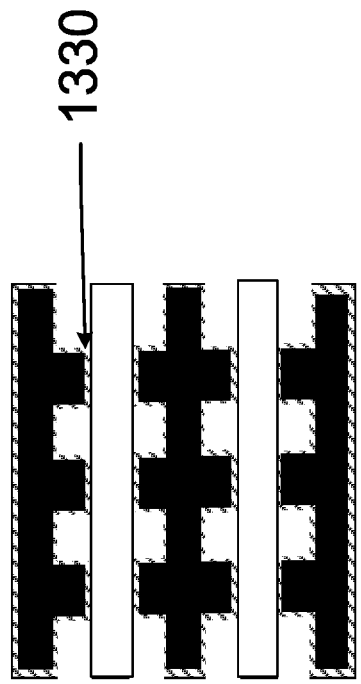
FIG. 13A-C illustrate alternative forms of elastomeric actuators based on structured electrodes with gaps and dielectrics.

Similar examples may be formed when a flat electrode is embossed, coated or otherwise shaped to have step like features. In FIG. 13A, an example of a stepped electrode shape may be found. The stepped electrode 1300 may interface with the electroactive elastomer 1310 and may form a void 1320 when no electrical bias is applied. In some examples, the structure thus formed may be wrapped around a channel. In other examples, a flat stack of elastomer and electrode pieces may form an electroactive actuator which may open a channel in a tube on electrical potential being applied to the electrodes. In other examples, the actuator may move a more complex needle valve structure which will limit the ability of material to move past the needle valve.

Figure 13B:
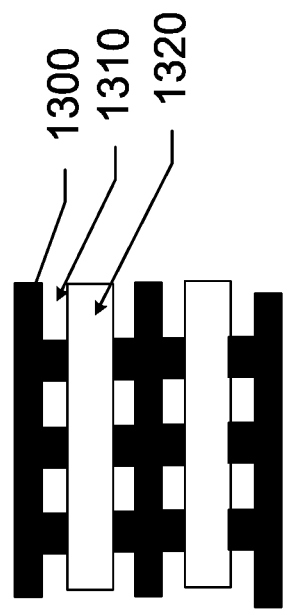

Referring to FIG. 13B an altered version of the electrode may be observed. The elastomeric film may have a potential to undergo electrical breakdown when an electrical potential is applied to actuate it. In the alternative of FIG. 13B a high quality dielectric film 1330 may coat the metal features of the electrode. The dielectric coating may comprise materials such as parylene, silicon dioxide, silicon nitride and the like. These materials may have such a large dielectric breakdown that "weak" portions of the electroactive film may be inhibited from breaking down since the coating may not breakdown for the applied field. It is noteworthy that in such a structure that the electrode does not contact the elastomeric film rather the electrode contacts the dielectric coating.

Figure 13C:
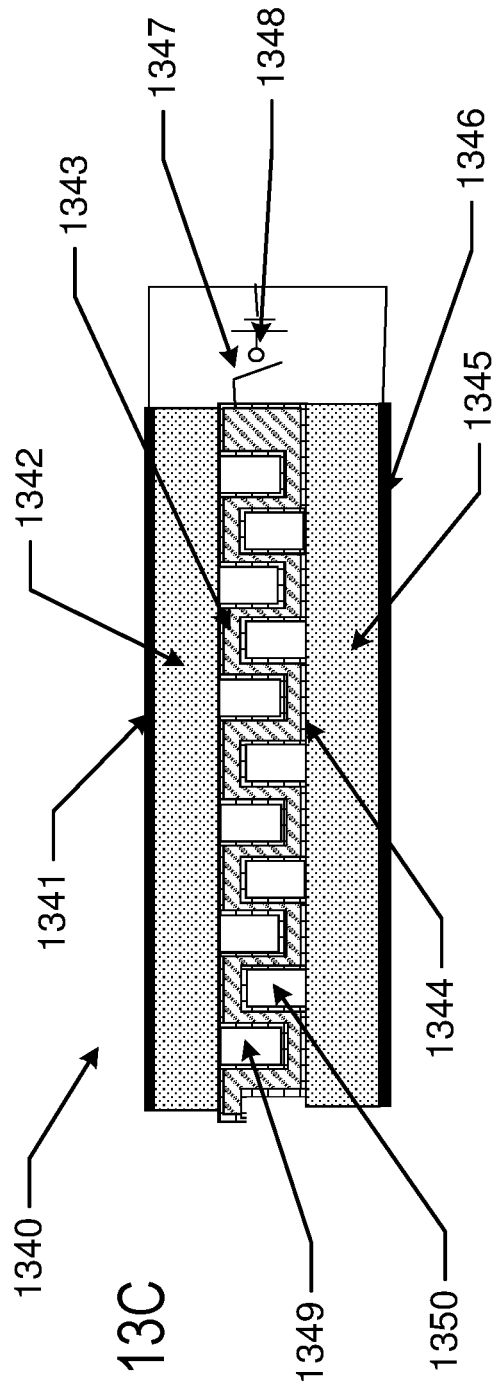

Referring to FIG. 13C another version 1340 of an electrode may be observed. An electrode 1343 may have a bent shape to accommodate pockets 1349 and pockets 1350 on either side of the electrode. As discussed in reference to FIG. 13B a dielectric film 1344 which may be a high quality dielectric film, may coat the metal electrode. The dielectric coating may comprise materials such as parylene, silicon dioxide, silicon nitride and the like. These materials may have such a large dielectric breakdown that "weak" portions of the electroactive film may be inhibited from breaking down since the coating may not breakdown for the applied field. Other electrodes 1341 and 1346 may be connected together at a common point of a battery 1348. A switch 1347 may allow for the controlled application of bias across the electrode pairs which have elastomer film 1342 and elastomer film 1345 between them in addition to the dielectric film 1344. In some examples, the flat electrodes 1341 and 1346 may be coated with the dielectric film as an alternative. In other examples all electrodes may be coated with a dielectric film. When an electric field is applied to the electrodes, such as when switch 1347 is turned on, the field applies a force across the elastomeric film which may cause it to deform. Shrinking in the region between electrodes and simultaneously expanding into the voids. The resulting actuator action may have enhanced reliability and performance by the coatings of dielectric along the electrodes. These coatings may have very little or no ability to deform under the presence of the electric field, yet they may ensure an enhancement of breakdown resistance of the resulting composite film device.

Figure 14:
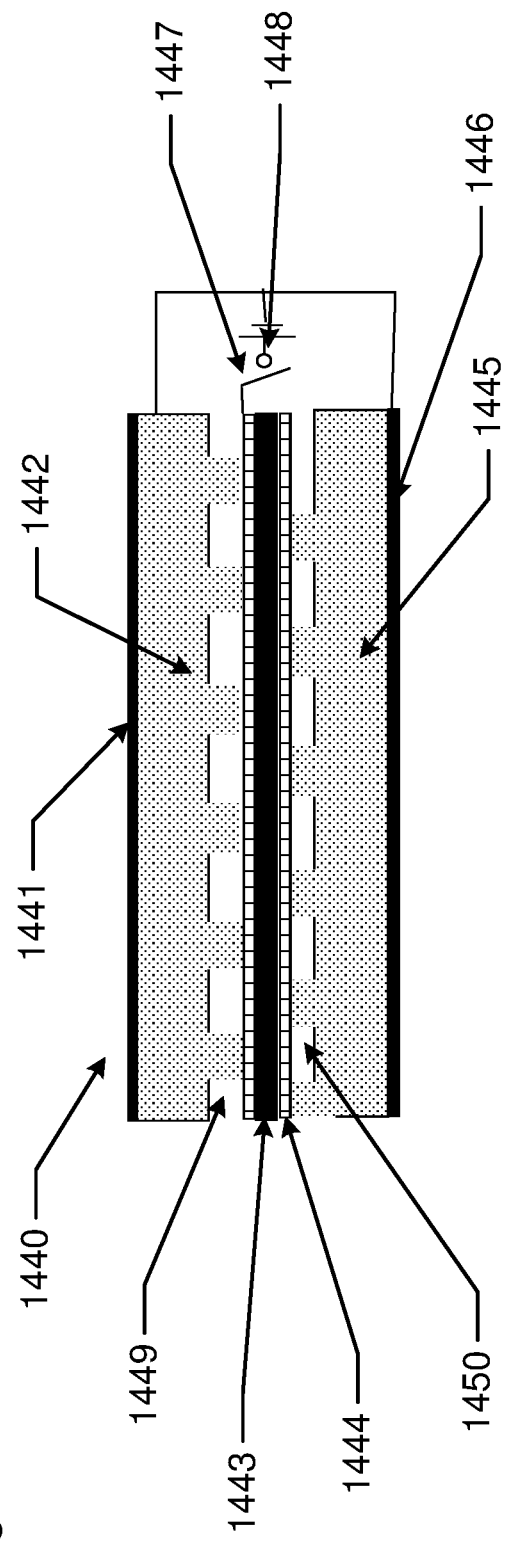
FIG. 14 illustrates an alternative form of elastomeric actuator based on structured elastomer layers with gaps and dielectrics.

Referring to FIG. 14 another version 1440 of the elastomer and electrode system may be observed. An electrode 1443 may be flat in some examples with a coating of a dielectric film 1444 on one or both sides of the electrode. The elastomer film layers 1442 and 1445 may have a bent shape or a dimpled shape with protrusions from the surface to accommodate pockets 1449 and pockets 1450 on either side of the electrode. As discussed in reference to FIG. 13B a dielectric film 1444 which may be a high quality dielectric film, may coat the metal electrode. The dielectric coating may comprise materials such as parylene, silicon dioxide, silicon nitride and the like. These materials may have such a large dielectric breakdown that "weak" portions of the electroactive film may be inhibited from breaking down since the coating may not breakdown for the applied field. Other electrodes 1441 and 1446 may be connected together at a common point of a battery 1448. A switch 1447 may allow for the controlled application of bias across the electrode pairs which have elastomer film 1442 and elastomer film 1445 between them in addition to the dielectric film 1444. In some examples, the electrodes on a flat side of the elastomer 1441 and 1446 may be coated with the dielectric film as an alternative. In some alternatives, both sides of the elastomer may have a bent shape with protrusions. In other examples all electrodes may be coated with a dielectric film. When an electric field is applied to the electrodes, such as when switch 1447 is turned on, the field applies a force across the elastomeric film which may cause it to deform. Shrinking in the region between electrodes and simultaneously expanding into the voids. The resulting actuator action may have enhanced reliability and performance by the coatings of dielectric along the electrodes. These coatings may have very little or no ability to deform under the presence of the electric field, yet they may ensure an enhancement of breakdown resistance of the resulting composite film device.

Figure 15A:
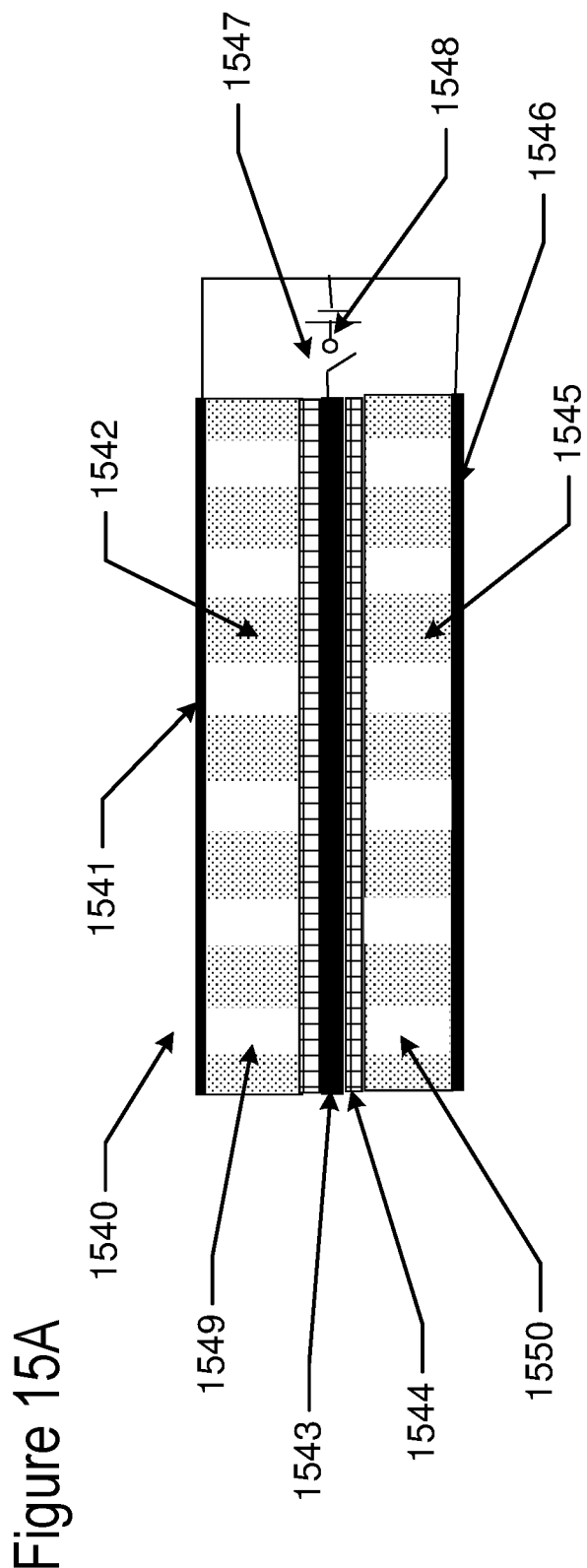
FIG. 15A illustrates an alternative form of elastomeric actuator based on structured elastomer layers with gaps and dielectrics.
Figure 15B:
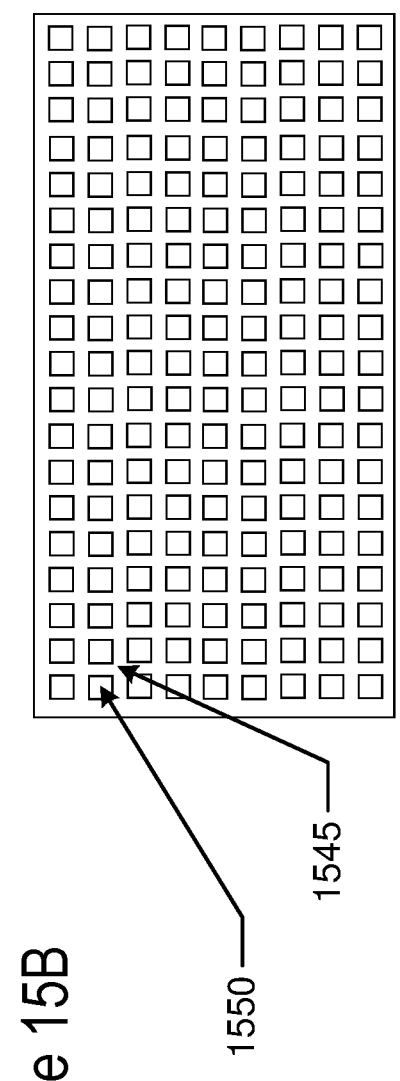
FIG. 15B illustrates an exemplary structured elastomer layer from top-down perspective

Referring to FIG. 15A another version 1540 of the elastomer and electrode system may be observed. An electrode 1543 may be flat in some examples with a coating of a dielectric film 1544 on one or both sides of the electrode. In some examples, there may be no coating of the dielectric film. The elastomer film layers 1542 and 1545 may have holes as deposited or holes cut into the film layers to form pockets 1549 and pockets 1550 on either side of the electrode. The cross section is depicted to go through the center of the holes. In other locations, the elastomer film may be a continuous film across the dimension of the electrode. The holes may provide regions that material may creep into as electrical potential is applied. The same characteristics as have been associated with high quality dielectric film coatings of the electrodes may apply. Other electrodes 1541 and 1546 may be connected together at a common point of a battery 1548. A switch 1547 may allow for the controlled application of electrical bias (illustrated as a battery symbol) across the electrode pairs which have elastomer film 1542 and elastomer film 1545 between them in addition to the dielectric film 1544. In some examples, the electrodes on a flat side of the elastomer 1541 and 1546 may be coated with the dielectric film as an alternative. In some examples all faces of electrodes may be coated with a dielectric film. When an electric field is applied to the electrodes, such as when switch 1547 is turned on, the field applies a force across the elastomeric film which may cause it to deform. Shrinking in the region between electrodes and simultaneously expanding into the voids. The resulting actuator action may have enhanced reliability and performance by the coatings of dielectric along the electrodes. These coatings may have very little or no ability to deform under the presence of the electric field, yet they may ensure an enhancement of breakdown resistance of the resulting composite film device. Referring to FIG. 15B an example of the structured elastomer film where holes or pockets 1550 penetrate the elastomer film 1545 structure is illustrated in cross section.

Arrays of Molten or Dissolved Droplet Deposition

Various types of material deposition out of AMArrays (Additive Manufacturing arrays) such as depicted in FIGS. 3A-D, have been described. In an example, heated materials such as thermoplastics may be ejected out of the individual array elements. Droplets of molten material may be printed onto an underlying surface and then when heat is conducted away by the surface and the surrounding air, the material may solidify into the location as printed. The resolution of the droplet size, the speed of movement of the Addibot and the number of simultaneous depositions of material upon the same location all may impact the nature of the results of the printing processing.

In some other examples, material may be dissolved in a solution. The liquid form of the solvated material may be deposited through an AMArray. The solvent in the droplet may evaporate leaving behind a more concentrated material. In some examples, the resulting deposit may form the end product, in other examples the deposit may be further treated by processing such as irradiation or heat treatment to polymerize or otherwise react the deposited material.

Teams of Addibots with Different Function—Preclean, Deposition and Inspection

In the referenced material of the current specification, description has been made that Addibots may be organized in teams to perform functions. In an example, the AMArray designs referenced in FIGS. 3 A-D may be used to deposit sealing material for road surfaces. Each of the Addibot designs may have the ability to clean a surface area that they are working on, view it, deposit it and then inspect/adjust the end result. In other examples, a team of Addibots may collectively perform the function but where individual Addibots may specialize on some of the task. The surface precleaning may be performed by one set of Addibots, the inspection by another, the deposition by another. There may be various combinations of processes that may be individually performed by Addibots acting in a team.

While the disclosure has been made in conjunction with specific examples, it is evident that many alternatives, modifications and variations will be apparent to those skilled in the art in light of the foregoing description. Accordingly, this description is intended to embrace all such alternatives, modifications and variations as fall within its spirit and scope. Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed invention. Moreover, although features may be described above as acting in certain combinations and even initially claimed as such, one or more features from a claimed combination can in some cases be excised from the combination, and the claimed combination may be directed to a sub-combination or variation of a sub-combination.

In some examples of roadway construction and repair and construction of walls, the additive manufacturing components of an Addibot may have been described in relationship to extrusion apparatus with molding forms to form the extruded material. There may be other additive manufacturing techniques such as extrusion from spatially controlled nozzles and other additive manufacturing techniques. In some examples of the creation of structures, the formation of walls have been described, there may be numerous structures that may be created in similar methods consistent with the present disclosure, such as sculptures and foundations as non-limiting examples Moreover, the separation of various system components in the embodiments described above should not be understood as requiring such separation in all embodiments. Examples of Addibots may include all system components or a subset of components and may act in multiples to perform various functions. Thus, while particular embodiments of the subject matter have been described, other embodiments are within the scope of the following claims.

What is claimed is:

1. A method for dispensing material with a mobile additive manufacturing apparatus, the method comprising:
    configuring the mobile additive manufacturing apparatus comprising:
        a controller capable of executing algorithms and providing control signals;
        an additive manufacturing system to deposit at least a first material in prescribed locations across a surface according to a first digital model processed by the controller, wherein the additive manufacturing system comprises an array of material dispensing elements, wherein the array of material dispensing elements places material dispensing elements at least along a first dimensional axis along a direction of travel of the mobile additive manufacturing axis and a second dimensional axis, wherein a first material dispensing element is oriented at a first coordinate of the first dimensional axis and a second coordinate of the second dimensional axis and a second material dispensing element is oriented at the first coordinate of the first dimensional axis and a third coordinate of the second dimensional axis and a third material dispensing element is oriented at a fourth coordinate of the first dimensional axis and a fifth coordinate of the second dimensional axis, wherein a distance along the second dimensional axis from the second coordinate to the third coordinate is an inter-element space and distance along the second dimensional axis from the second coordinate to the fifth coordinate is a fraction of the inter-element space;

a drive system operative to transport the additive manufacturing system along the surface;

a navigation system to determine a location of the additive manufacturing system and guide the drive system;

a power system capable of providing power to operate at least the drive system, navigation system, control system and additive manufacturing system; and wherein the material dispensing elements comprise an electroactive elastomeric actuator to open an orifice from a fully closed state at a portion of each of the material dispensing elements; and wherein when an electrical signal actuates an opening of the orifice, material is dispensed through the orifice to the surface;

moving the mobile additive manufacturing apparatus along the surface to a first prescribed location; and changing an electrical potential across a pair of electrodes of the electroactive elastomeric actuator of at least one of the material dispensing elements to cause it to open the orifice and to dispense the first material.

2. The method according to claim 1 additionally comprising:

moving the mobile additive manufacturing apparatus to a roadway surface;

pressurizing a first material in a material container;

forming a first deposit of the first material on the surface;

moving the mobile additive manufacturing apparatus to a different location; and forming a second deposit of the first material on the different location.

3. A method for dispensing material with a mobile additive manufacturing apparatus, the method comprising:

configuring the mobile additive manufacturing apparatus comprising:

a controller capable of executing algorithms and providing control signals;

an additive manufacturing system to deposit at least a first material in prescribed locations across a surface according to a first digital model processed by the controller, wherein the system comprises an array of material dispensing elements, wherein the array of material dispensing elements places material dispensing elements at least along a first dimensional axis along a direction of travel of the mobile additive manufacturing axis and a second dimensional axis, wherein a first material dispensing element is oriented at a first coordinate of the first dimensional axis and a second coordinate of the second dimensional axis and a second material dispensing element is oriented at the first coordinate of the first dimensional axis and a third coordinate of the second dimensional axis and a third material dispensing element is oriented at a fourth coordinate of the first dimensional axis and a fifth coordinate of the second dimensional axis, wherein a size of the first material dispensing element differs from a size of one or more of the second material dispensing element, and third material dispensing element;

a drive system operative to transport the additive manufacturing system along the surface;

a navigation system to determine a location of the additive manufacturing system and guide the drive system;

a power system capable of providing power to operate at least the drive system, navigation system, control system and additive manufacturing system; and wherein the material dispensing elements comprise an electroactive elastomeric actuator to open an orifice from a fully closed state at a portion of each of the material dispensing elements; and wherein when an electrical signal actuates an opening of the orifice, material is dispensed through the orifice to the surface;

moving the mobile additive manufacturing apparatus along the surface to a first prescribed location; and changing an electrical potential across a pair of electrodes of the electroactive elastomeric actuator of at least one of the material dispensing elements to cause it to open an the orifice and to dispense the first material.

4. The method according to claim 3 additionally comprising:

moving the mobile additive manufacturing apparatus to a roadway surface;

pressurizing a first material in a material container;

forming a first deposit of the first material on the surface; and moving the mobile additive manufacturing apparatus to a different location; and forming a second deposit of the first material on the different location.

5. The method of claim 1 wherein the electroactive elastomeric actuator comprises multiple electrodes deployed across the axis of the electroactive elastomeric actuator, wherein the axis is along a direction of material flow through the orifice.

6. The method of claim 5 wherein the electroactive elastomeric actuator further comprises at least two distinct multiple electrode regions along the axis of the electroactive elastomeric actuator.

7. The method of claim 6 further comprises a dosing reservoir along the axis of the electroactive elastomeric actuator.

8. The method of claim 3 wherein the electroactive elastomeric actuator comprises multiple electrodes deployed across the axis of the electroactive elastomeric actuator, wherein the axis is along a direction of material flow through the orifice.

9. The method of claim 8 wherein the electroactive elastomeric actuator further comprises at least two distinct multiple electrode regions along the axis of the electroactive elastomeric actuator.

10. The method of claim 9 further comprises a dosing reservoir along the axis of the electroactive elastomeric actuator.

\* \* \* \* \*